US011847355B2

(12) United States Patent
Martineau et al.

(10) Patent No.: US 11,847,355 B2
(45) Date of Patent: *Dec. 19, 2023

(54) MULTISTREAMING IN HETEROGENEOUS ENVIRONMENTS

(71) Applicant: Samsung Electronics Co., Ltd., Suwon-si (KR)

(72) Inventors: Jason Martineau, San Jose, CA (US); Changho Choi, San Jose, CA (US); Rajinikanth Pandurangan, Fremont, CA (US); Jingpei Yang, San Ramon, CA (US)

(73) Assignee: SAMSUNG ELECTRONICS CO., LTD.

(*) Notice: Subject to any disclaimer, the term of this patent is extended or adjusted under 35 U.S.C. 154(b) by 0 days.

This patent is subject to a terminal disclaimer.

(21) Appl. No.: 17/973,529

(22) Filed: Oct. 25, 2022

(65) Prior Publication Data

US 2023/0042833 A1 Feb. 9, 2023

Related U.S. Application Data

(63) Continuation of application No. 17/229,857, filed on Apr. 13, 2021, now Pat. No. 11,507,326, which is a (Continued)

(51) Int. Cl.
G06F 3/06 (2006.01)
H04B 1/06 (2006.01)
H04B 1/02 (2006.01)

(52) U.S. Cl.
CPC ............ *G06F 3/067* (2013.01); *G06F 3/0604* (2013.01); *G06F 3/0608* (2013.01);
(Continued)

(58) Field of Classification Search
CPC ...... G06F 3/067; G06F 3/0604; G06F 3/0608; G06F 3/0649; G06F 3/0659;
(Continued)

(56) References Cited

U.S. PATENT DOCUMENTS 7,296,124 B1 11/2007 Falik
8,205,037 B2 6/2012 Swing et al.
(Continued)

FOREIGN PATENT DOCUMENTS

CN 103765407 A 4/2014
JP 2006235960 A 9/2006
(Continued)

OTHER PUBLICATIONS

Advisory Action for U.S. Appl. No. 15/690,270, dated Apr. 20, 2020.
(Continued)

*Primary Examiner* — David Yi
*Assistant Examiner* — Zubair Ahmed
(74) *Attorney, Agent, or Firm* — Renaissance IP Law Group LLP

(57) ABSTRACT

A storage device is disclosed. The storage device may include storage to store data, which may include a first storage of a first type and a second storage of a second type. The storage device may support a number of device streams, some of which associated with the first storage and some associated with the second storage. The storage device may also include a streaming capabilities analyzer that may inventory the streaming capabilities for the storage device. Finally, the storage device may include a transmitter to transmit the streaming capabilities of the storage device to a storage manager.

20 Claims, 15 Drawing Sheets

Related U.S. Application Data continuation of application No. 15/690,270, filed on Aug. 29, 2017, now abandoned.

(60) Provisional application No. 62/511,957, filed on May 26, 2017, provisional application No. 62/501,087, filed on May 3, 2017.

(52) U.S. Cl.
CPC .......... *G06F 3/0649* (2013.01); *G06F 3/0659* (2013.01); *G06F 3/0685* (2013.01); *H04B 1/02* (2013.01); *H04B 1/06* (2013.01)

(58) Field of Classification Search
CPC .. G06F 3/0685; G06F 12/0253; G06F 3/0631; G06F 3/0652; G06F 3/0653; G06F 3/0658; G06F 3/0688; H04B 1/02; H04B 1/06; G11C 16/16
USPC .................................................. 711/102, 101
See application file for complete search history.

(56) References Cited

U.S. PATENT DOCUMENTS

| | | | |
|---|---|---|---|
| 8,250,271 | B2 | 8/2012 | Swing et al. |
| 8,639,871 | B2 * | 1/2014 | Borchers ............... G06F 3/0659 |
| | | | 711/E12.001 |
| 8,874,835 | B1 | 10/2014 | Davis et al. |
| 9,158,461 | B1 | 10/2015 | Lee |
| 9,465,753 | B2 | 10/2016 | Zbiciak et al. |
| 9,524,120 | B2 | 12/2016 | Ashok et al. |
| 9,542,293 | B2 | 1/2017 | Sprague et al. |
| 9,569,178 | B1 | 2/2017 | Barsness et al. |
| 10,089,360 | B2 | 10/2018 | Narasimha et al. |
| 10,101,947 | B2 | 10/2018 | Hong et al. |
| 10,191,688 | B2 | 1/2019 | Amaki et al. |
| 2008/0215800 | A1 | 9/2008 | Lee et al. |
| 2009/0221271 | A1 | 9/2009 | Soma et al. |
| 2010/0262894 | A1 | 10/2010 | Swing et al. |
| 2012/0072798 | A1 | 3/2012 | Unesaki et al. |
| 2012/0191900 | A1 | 7/2012 | Kunimatsu et al. |
| 2012/0254524 | A1 | 10/2012 | Fujimoto |
| 2012/0290786 | A1 | 11/2012 | Mesnier |
| 2013/0205005 | A1 | 8/2013 | Ashok et al. |
| 2015/0324255 | A1 * | 11/2015 | Kochunni .......... G06F 11/1464 |
| | | | 711/162 |
| 2016/0044077 | A1 | 2/2016 | Tripathy et al. |
| 2016/0170583 | A1 | 6/2016 | Heics |
| 2016/0299715 | A1 | 10/2016 | Hashimoto et al. |
| 2016/0313943 | A1 * | 10/2016 | Hashimoto .......... G06F 3/0659 |
| 2016/0364173 | A1 | 12/2016 | Frank et al. |
| 2017/0031631 | A1 | 2/2017 | Lee et al. |
| 2017/0324677 | A1 | 11/2017 | Berland et al. |
| 2018/0039448 | A1 | 2/2018 | Harasawa et al. |
| 2018/0232160 | A1 * | 8/2018 | Das ........................ G06F 3/061 |
| 2018/0234478 | A1 | 8/2018 | Das et al. |

FOREIGN PATENT DOCUMENTS

| | | |
|---|---|---|
| JP | 2012523623 A | 10/2012 |
| JP | 2012523624 A | 10/2012 |
| JP | 5723812 B2 | 5/2015 |
| JP | 2016170583 A | 9/2016 |
| KR | 20120098850 A | 9/2012 |
| KR | 20160150029 A | 12/2016 |
| KR | 20170026926 A | 3/2017 |
| WO | 2012020544 A1 | 2/2012 |
| WO | 2015005634 A1 | 1/2015 |

OTHER PUBLICATIONS

Advisory Action for U.S. Appl. No. 15/690,270, dated Jul. 30, 2019.
Final Office Action for U.S. Appl. No. 15/690,270, dated Feb. 3, 2020.
Final Office Action for U.S. Appl. No. 15/690,270, dated May 3, 2019.
Notice of Allowance for U.S. Appl. No. 15/690,270, dated Jan. 13, 2021.
Notice of Allowance for U.S. Appl. No. 17/229,857, dated Jul. 19, 2022.
Office Action for U.S. Appl. No. 15/690,270, dated Jul. 29, 2020.
Office Action for U.S. Appl. No. 15/690,270, dated Nov. 23, 2018.
Office Action for U.S. Appl. No. 15/690,270, dated Oct. 10, 2019.

* cited by examiner

| Device ID | Stream IDs | Media Type | In-Storage Computing? | Tail Latency Management | Connection | GC Erase Block Size | GC Latency | Buffer Size |
|---|---|---|---|---|---|---|---|---|
| 1 | 0-3 | SMR | No | No | 6 GB SAS | 64 MB | Very High | 512 Mb |
| 2 | 4-11 | MLC | No | Yes | 10 GB Ethernet | 4 MB | Medium | 1 GB |
| 3 | 12-13 | SLC | Yes | Yes | PCIe X4 | 1 MB | Low | 1 GB Shared |
| 3 | 14-17 | MLC | Yes | Yes | PCIe X4 | 4 MB | High | 1 GB Shared |

| Use Case | Target Streams | Weights | | | | | | |
|---|---|---|---|---|---|---|---|---|
| | | Media Type | In-Storage Computing? | Tail Latency Management | Connection | GC Erase Block Size | GC Latency | Buffer Size |
| Long-term storage | 0-3 | SMR .25<br>MLC .50<br>SLC .75 | .75 | .75 | 0 | 0 | .25 | 0 |
| In-storage computing | 12-13 | SLC .25<br>MLC .50<br>SMR .75 | -100 | .75 | 0 | .25 | .75 | .25 |
| High throughput | 4-11 | SLC .25<br>MLC .50<br>SMR .75 | .75 | .25 | .45 | .50 | .75 | .25 |

MULTISTREAMING IN HETEROGENEOUS ENVIRONMENTS

RELATED APPLICATION DATA

This application is a continuation of U.S. patent application Ser. No. 17/229,857, filed Apr. 13, 2021, now allowed, which is a continuation of U.S. patent application Ser. No. 15/690,270, filed Aug. 29, 2017, now abandoned, which claims the benefit of U.S. Provisional Patent Application Ser. No. 62/501,087, filed May 3, 2017, and U.S. Provisional Patent Application Ser. No. 62/511,957, filed May 26, 2017, all of which are incorporated by reference herein for all purposes.

U.S. patent application Ser. No. 15/690,270, filed Aug. 29, 2017, now allowed, is related to U.S. patent application Ser. No. 15/046,439, filed Feb. 17, 2016, now U.S. Pat. No. 9,880,780, issued Jan. 30, 2018, which claims the benefit of U.S. Provisional Patent Application Ser. No. 62/261,303, filed Nov. 30, 2015, filed Apr. 11, 2017, both of which are incorporated by reference herein for all purposes.

U.S. patent application Ser. No. 15/690,270, filed Aug. 29, 2017, now allowed, is related to U.S. patent application Ser. No. 15/089,237, filed Apr. 1, 2016, now U.S. Pat. No. 9,959,046, issued May 1, 2018, which claims the benefit of U.S. Provisional Patent Application Ser. No. 62/273,323, filed Dec. 30, 2015, both of which are incorporated by reference herein for all purposes.

U.S. patent application Ser. No. 15/690,270, filed Aug. 29, 2017, now allowed, is related to U.S. patent application Ser. No. 15/146,708, filed May 4, 2016, now U.S. Pat. No. 9,898,202, issued Feb. 20, 2018, which is a continuation-in-part of U.S. patent application Ser. No. 15/046,239, filed Feb. 17, 2016, now U.S. Pat. No. 9,880,780, issued Jan. 30, 2018, which claims the benefit of U.S. Provisional Patent Application Ser. No. 62/261,303, filed Nov. 30, 2015, all of which are incorporated by reference herein for all purposes; U.S. patent application Ser. No. 15/146,708, filed May 4, 2016, also claims the benefit of U.S. Provisional Patent Application Ser. No. 62/302,162, filed Mar. 1, 2016, which is incorporated by reference herein for all purposes.

U.S. patent application Ser. No. 15/690,270, filed Aug. 29, 2017, now allowed, is related to U.S. patent application Ser. No. 15/161,144, filed May 20, 2016, now abandoned, which claims the benefit of U.S. Provisional Patent Application Ser. No. 62/314,920, filed Mar. 29, 2016, both of which are incorporated by reference herein for all purposes.

U.S. patent application Ser. No. 15/690,270, filed Aug. 29, 2017, now allowed, is related to U.S. patent application Ser. No. 15/167,974, filed May 27, 2016, now U.S. Pat. No. 10,592,171, issued Mar. 17, 2020, which claims the benefit of U.S. Provisional Patent Application Ser. No. 62/309,446, filed Mar. 16, 2016, both of which are incorporated by reference herein for all purposes.

U.S. patent application Ser. No. 15/690,270, filed Aug. 29, 2017, now allowed, is related to U.S. patent application Ser. No. 15/653,479, filed Jul. 18, 2017, now U.S. Pat. No. 10,545,664, issued Jan. 28, 2020, which claims the benefit of U.S. Provisional Patent Application Ser. No. 62/484,387, filed Apr. 11, 2017, both of which are incorporated by reference herein for all purposes.

FIELD

The inventive concepts relate generally to Solid State Drives (SSDs), and more particularly to managing streaming using SSDs of differing performance capabilities.

BACKGROUND

Multi-streaming is a recent Solid State Drive (SSD) feature that allows systems to assign "streams" to data. Each stream is kept physically separate on the SSD, improving Garbage Collection and Write Amplification Factor behaviors. Data that has expected similar lifetimes may be grouped together in a stream, resulting (ideally) in all data in an erase block being invalidated at about the same time. As a result, Garbage Collection would need to Program less (or no) valid data from an erase block before erasing the block, reducing the Write Amplification Factor of the SSD.

If every storage device in a system were identical in every respect, multi-streaming would be a simple matter to implement. Regardless of what stream would be selected to write a particular data, the expected performance of the target storage device would be the same (or near enough); almost any data could be assigned to almost any stream and to any drive.

But such homogeneity in systems is rare. Typically, systems include a mix of storage devices: different types of devices (for example, hard disk drives vs. SSDs), different performance levels (for example, different read and/or write latencies, or different Garbage Collection characteristics), and/or different connectors (for example, Serial Attached Small Computer Systems Interface (SAS) vs. Ethernet). Even devices that are otherwise identical in manufacture and connection might still perform differently. For example, consider two SSD storage devices, both connected identically to a host machine. If one of the two SSD receives significantly more than 50% of the commands issued by the host machine, that SSD might end up with significantly more Garbage Collection and Write Amplification than the other SSD, not to mention slower performance due to more commands in the Input/Output (I/O) queue.

A need remains for a way to determine the manage streams for heterogeneous storage devices.

BRIEF DESCRIPTION OF THE DRAWINGS

FIGS. 10A-10B show example data structures to store the streaming capabilities of the storage device of FIG. 1 and related information.

DETAILED DESCRIPTION

Figure 1:
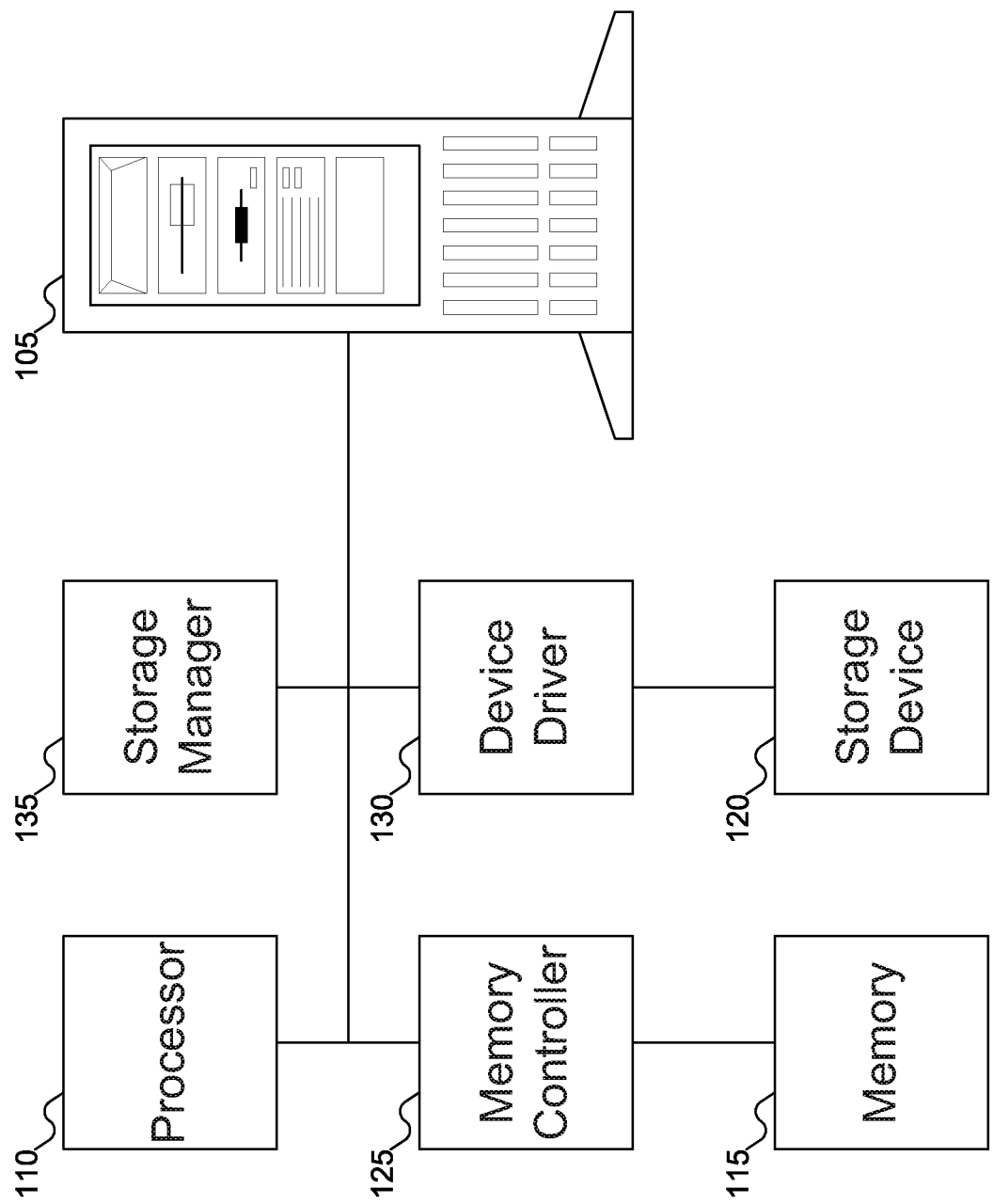
FIG. 1 shows a machine with a storage device, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

In the context of "multi-streaming", there are two types of streams of interest. The first type of stream is the software stream (sometimes called an application stream). A software stream is a software concept that depends on the application that is defining the streams. An application may define any number of streams for its own use. For example, an application or an operating system might define one stream for data with a long life, another stream for data that is stored only temporarily, and so on. In addition, applications may use other criteria to differentiate between streams: the use of data lifetime is merely one example approach.

The second type of stream is the device stream. The device stream is a hardware concept, representing an individual "path" through the storage device for data storage. Each device is capable of supporting a particular number of device streams. The number of device streams is typically known in advance since the number is bounded by hardware limitations.

A storage device may communicate with a host the particular physical and logical attributes (or, alternatively, some abstraction of this information) that may be associated with both the entire drive and its potential streams. Using the information, the host will be able to assign streams to applications based on any Quality of Service (QoS) requirements the applications (and their individual streams) may impose. By informing the host of the capabilities associated with each drive and its device streams, (which the host may supplement with stream-external factors) the host may make the most efficient use of multi-streaming capacity.

As an example, imagine a sample Ethernet attached Solid State Drive (SSD) having both Single-Level Cell (SLC) and Triple-Level Cell (TLC) flash, and capable of supporting eight streams. This drive could report to the host:

1) The drive type (e.g. the fact that it is an Ethernet SSD).
2) Any experienced network latency in communicating with that host.
3) The latencies of (or relative latencies of) the SLC and TLC.
4) Any limit on assigning streams to SLC vs TLC.

Other drives would likewise report their essential stream metrics to the host. Thereafter, the host would be able to analyze any QoS requirements of an application (or an individual stream), and assign that application (or stream) to the drive that most suits it.

At storage device start-up (and periodically thereafter), the storage device self-inventories its streaming capabilities. In embodiments of the inventive concept, then streaming capabilities may include the number of hardware streams supported, the size of erase blocks, internal physical heterogeneity, auto-streaming capability and parameters, and Program and Erase speed parameters associated with potential streams, among others.

Note also that this invention enables applications to utilize multiple streams, each of which may have different QoS requirements (as compared with data lifetime requirements). Conventional multi-streaming systems have assumed that each stream provided similar performance: embodiments of the inventive concept discard this assumption. As a result, embodiments of the inventive concepts should reduce the overall "QoS" burden on the system by creating a finer QoS granularity. That is, within the context of multi-streaming, rather than giving an application all high-demand QoS resources because some small portion of it required that QoS level, embodiments of the inventive concept allow a small, high-demand QoS portion of an application to be given just one high QoS stream, and the other streams of the application may be given to low QoS resources.

FIG. 1 shows a machine with a storage device, according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors, each of which may be single core or multi-core processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc., but is typically Dynamic Random Access Memory (DRAM). Memory 115 may also be any desired combination of different memory types. Memory 115 may be controlled by memory controller 125, also part of machine 105.

Storage device 120 may be any variety of storage device that may support multi-streaming. Storage device 120 may be controlled by device driver 130, which may reside within memory 115.

Finally, machine 105 may include storage manager 135. Storage manager 135 may direct requests from applications or other software sources to appropriate destinations. In embodiments of the inventive concept, storage manager 135 may assign requests to device streams associated with storage device 120 based on the streaming capabilities of storage device 120. While FIG. 1 shows only one storage device 120, embodiments of the inventive concept may support any number of storage devices. In addition, storage device 120 may be located within machine 105, or located externally: perhaps accessible over a network (not shown in FIG. 1). Storage manager 135 may be implemented as hardware, a combination of hardware and software, or just software running on processor 110. Throughout this document, any reference to "storage manager 135" may also be read more generally as describing machine 105.

Figure 2:
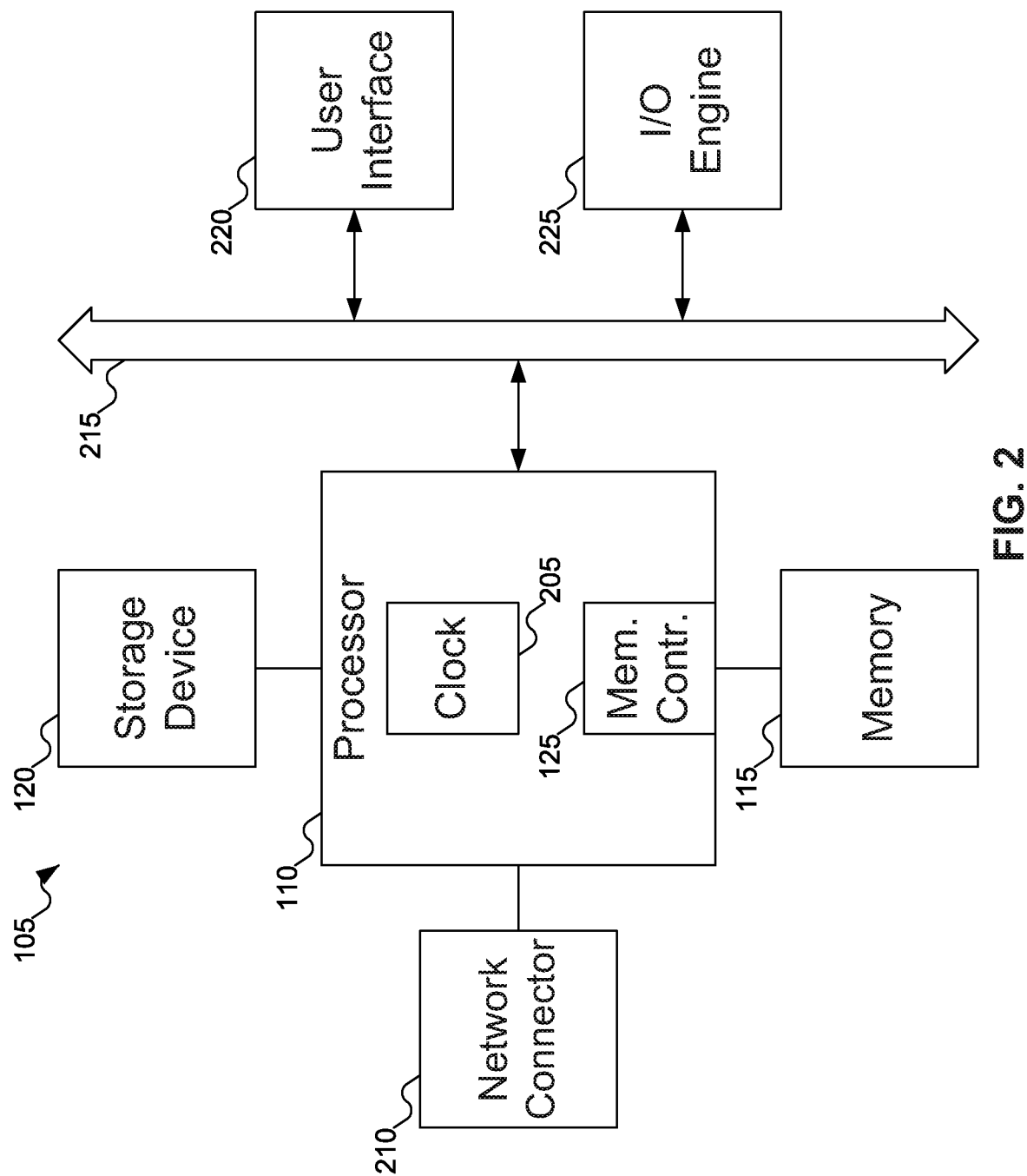
FIG. 2 shows additional details of the machine of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

Figure 3:
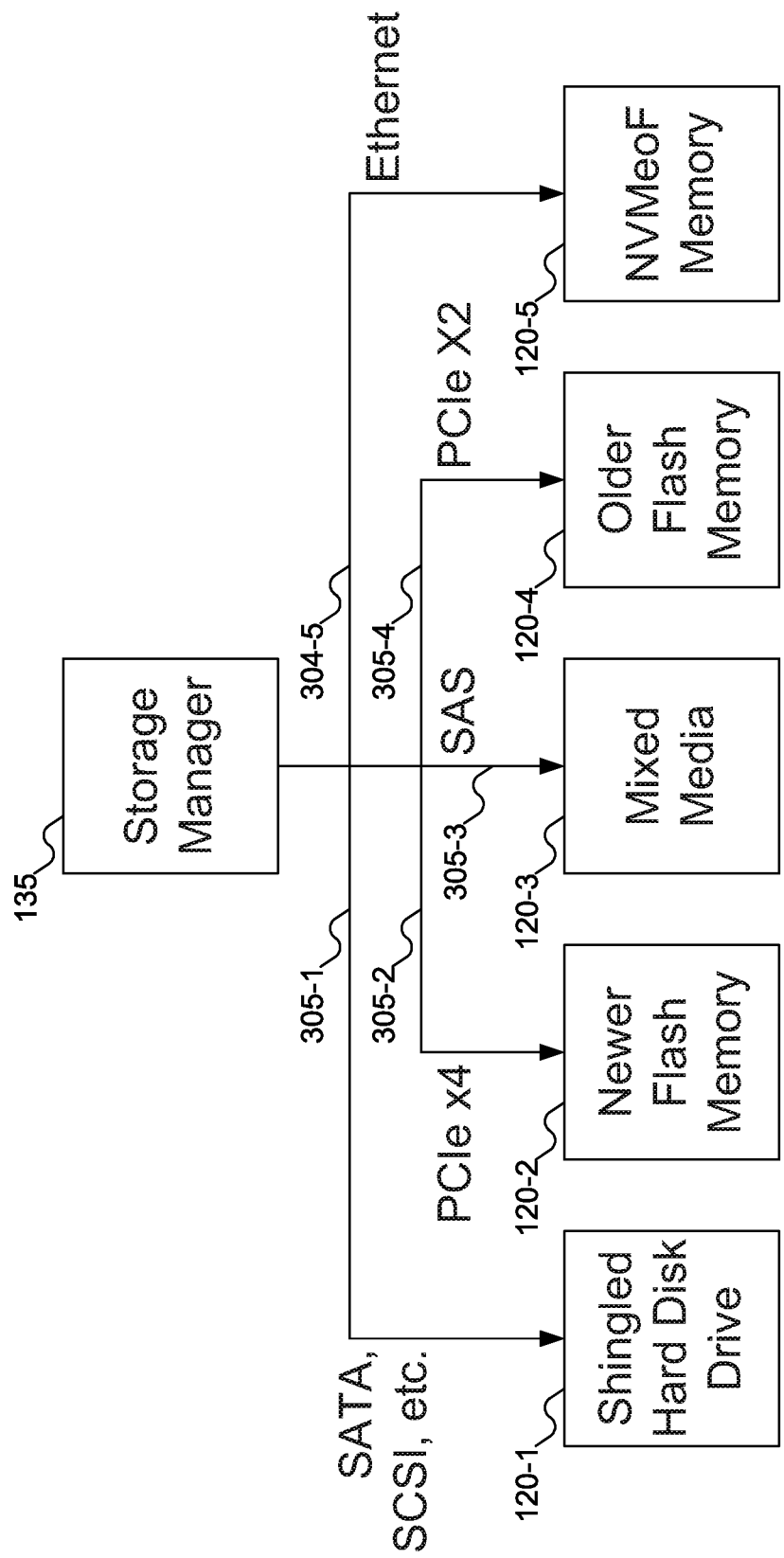
FIG. 3 shows the storage manager of FIG. 1 communicating with storage devices of different types and capabilities.

FIG. 3 shows storage manager 135 of FIG. 1 communicating with storage devices of different types and capabilities. In FIG. 3, storage manager 135 is shown communicating with five storage devices of different types, and using a variety of communication protocols. Storage manager 135 may communicate with shingled Hard Disk Drive (HDD) 120-1 using older protocol 305-1, which might be Serial AT Attachment (SATA), Small Computer Systems Interface (SCSI), or others that are appropriate. Storage manager 135 may communicate with newer flash memory storage device 120-2, which may be a multi-streaming Solid State Drive (SSD), using protocol 305-2, which may be over four lines of a Peripheral Component Interconnect Exchange (PCIe) connection. Storage manager 135 may communicate with mixed media storage device 120-3, using protocol 305-3, which may be Serial Attached Small Computer Systems Interface (SAS). Storage manager 135 may communicate with older flash memory storage device 120-4, using protocol 305-4, which may be over two lines of a PCIe connection. And storage manager 135 may communicate with Non-Volatile Memory Express Over Fabric (NVMeoF) storage device 120-5, using protocol 305-5, which may be an Ethernet connection.

While the concepts of flash memory storage devices 120-2 and 120-4, and NVMeoF storage device 120-5, are well understood, additional explanation about shingled HDD 120-1 and mixed media storage device 120-3 may be useful. In a traditional HDD, each track of data is separate: the tracks do not overlap. This simplifies data management on the HDD: when data is to be changed, the original track may be overwritten without affecting any other data on the HDD. Shingled HDD 120-1 uses Shingled Magnetic Recording (SMR), where adjacent tracks on the HDD partially overlap each other. This approach has the advantage of increasing the data density of the HDD (with narrower tracks, more data may be written), but it complicates the process of writing data. Specifically, when data is written to the HDD, that writing process affects the adjacent overlapped tracks. Thus, when shingled HDD 120-1 writes data, it does not write the data to the original track. Instead, shingled HDD 120-1 writes the data to a new track, and subjects the old track to Garbage Collection, much like flash memory storage devices 120-2 and 120-4 and NVMeoF storage device 120-5.

Mixed media storage device 120-3 is a storage device that includes more than one type of storage media. For example, mixed media storage device 120-3 may include multiple different types of flash memory, such as Single-Level Cells (SLCs), Multi-Level Cells (MLCs), Triple-Level Cells (TLCs), and the like. Or, mixed media storage device 120-3 may include some flash memory and some other storage format, such as HDD. Embodiments of the inventive concept may support mixed media storage device 120-3 including any different types of storage media, without limitation.

While FIG. 3 shows storage manager 135 communicating with five different storage devices using five different protocols, embodiments of the inventive concept may support communicating with any number of storage devices over any number of protocols. The storage devices 120 may include any mix of types, and may use any mix of protocols 305 to communicate with storage manager 135.

Figure 4:
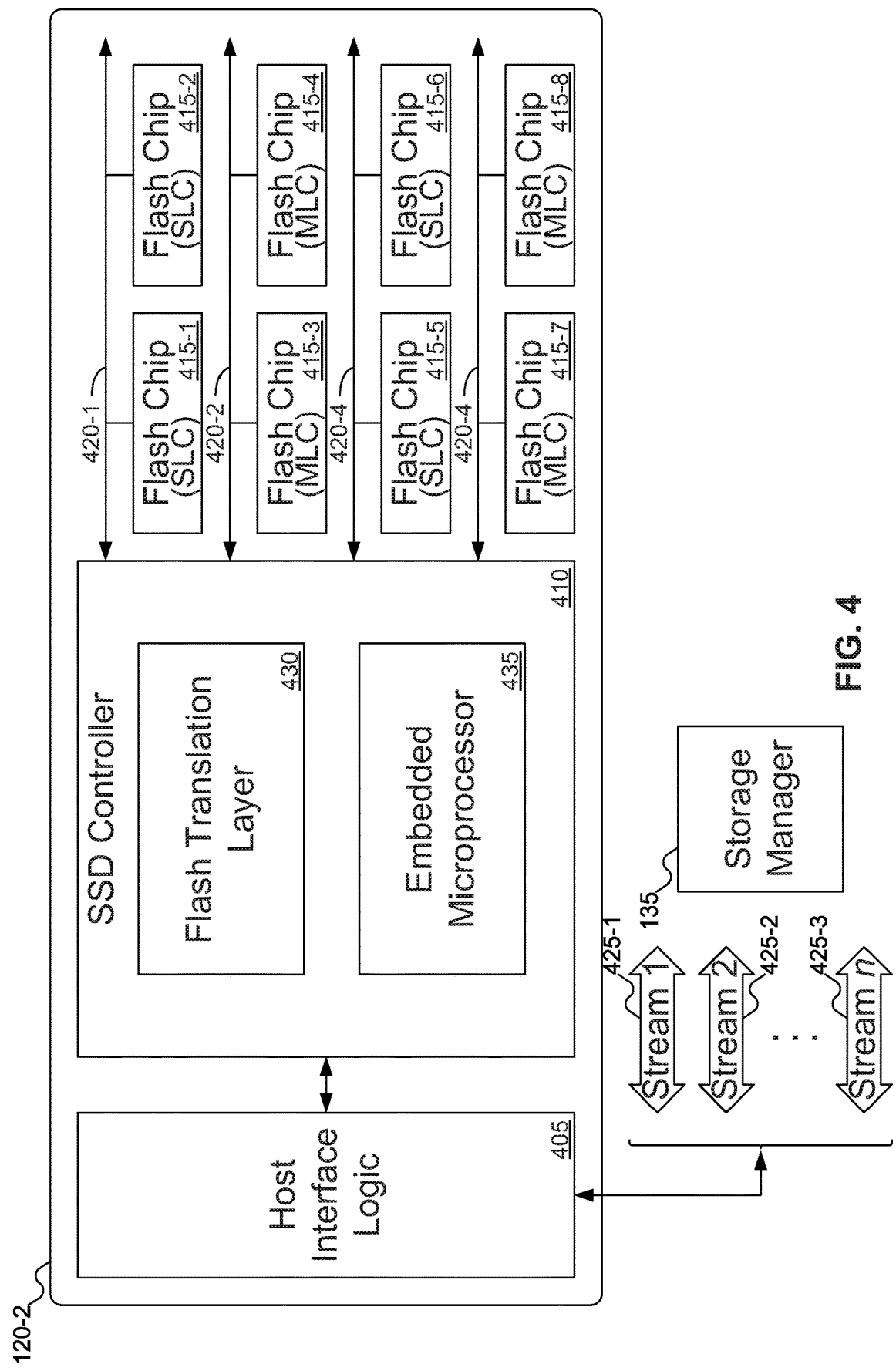
FIG. 4 shows details of the SSD of FIG. 3.

FIG. 4 shows details of SSD 120-2 of FIG. 3. In FIG. 4, SSD 120-2 may include host interface logic 405, SSD controller 410, and various flash memory chips 415-1 through 415-8, which may be organized into various channels 420-1 through 420-4. Host interface logic 405 may manage communications between SSD 120-2 and storage manager 135 or machine 105 of FIG. 1. SSD 120-2 may use device streams 425-1 through 425-3 to communicate with storage manager 135 or host machine 105 of FIG. 1. (SSD 120-2 and host machine 105 of FIG. 1 may also be understood to communicate via application streams, as described below with reference to FIG. 8: in general, properties attributed to either device streams 425-1 through 425-3 or the application streams may be attributed to the other type of stream.) SSD controller 410 may manage the read and write operations, along with garbage collection operations, on flash memory chips 415-1 through 415-8. SSD controller 410 may include flash translation layer 430 to perform some of this management.

While FIG. 4 shows SSD 120-2 as including eight flash memory chips 415-1 through 415-8 organized into four channels 420-1 through 420-4, embodiments of the inventive concept may support any number of flash memory chips organized into any number of channels. In addition, embodiments of the inventive concept may support any number of devices streams 425-1 through 425-3.

Flash memory chips 415-1 through 415-8 may all be of the same type, or they may be of different types. For example, in FIG. 4 flash memory chips 415-1, 415-2, 415-5, and 415-6 are shown to be Single-Level Cells (SLCs), whereas flash memory chips 415-3, 415-4, 415-7, and 415-8 are shown to be Multi-Level Cells (MLCs). SLCs may store only one bit (either 0 or 1), and are typically more expensive than MLCs, but typically have faster write speeds and may be written and erased many times. MLCs may store more than one bit—depending on the variety of MLC, two, three, or more bits of data—at lower cost, but are typically slower to write and may be written and erased fewer times than SLCs.

While SSD 120-2, as shown in FIG. 4, shows details that are specific to SSD 120-2, the concepts represented in FIG. 4 may be generalized to other storage devices. For example, shingled HDD 120-1 of FIG. 3 may use magnetic media with read and write heads, rather than flash memory, to store the data. But shingled HDD 120-1 of FIG. 3 may offer device streams 425-1 through 425-3. For example, shingled HDD 120-1 of FIG. 1 might manage its read and write operations differently from SSD 120-2 and might manage read and write operations using a component other than SSD controller. But the overall functionality—reading and writing data, supporting multiple device streams, etc.—are similar. Thus, while the specific implementation of storage device 120 of FIG. 1 may vary, other storage devices 120 of FIG. 3 may support the same operations.

Figure 5:
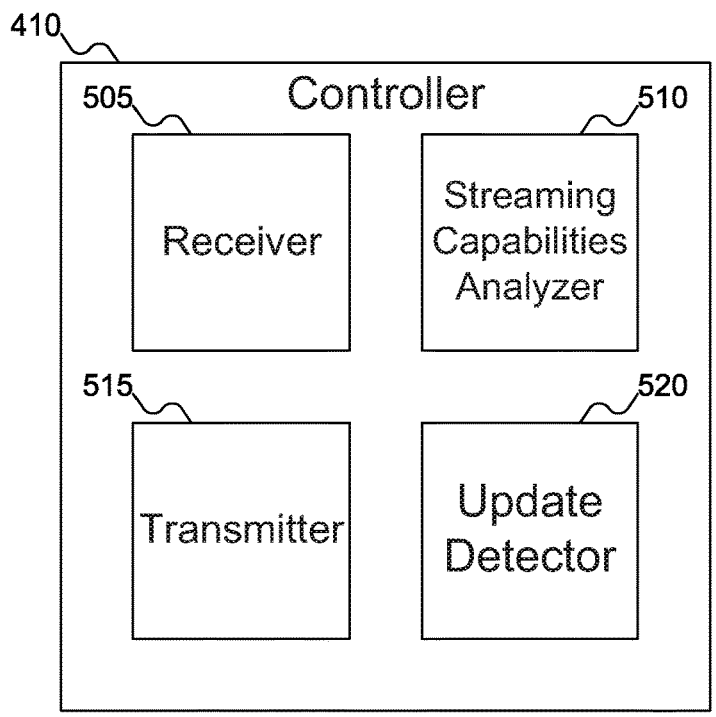
FIG. 5 shows details of a controller of the storage device of FIG. 1.

FIG. 5 shows details of controller 410 of storage device 120 of FIG. 1. In FIG. 5, controller 410 may include receiver 505, streaming capabilities analyzer 510, transmitter 515, and update detector 520. Receiver 505 may receive a request from storage manager 135 of FIG. 1 for the streaming capabilities of storage device 120 of FIG. 1. Receiver 505 is optional, in the sense that controller 410 may send the streaming capabilities of storage device 120 of FIG. 1 to storage manager 135 of FIG. 1 automatically (that is, without prompting from storage manager 135 of FIG. 1). Some storage devices may operate passively, only sending information (such as its streaming capabilities) after receiving a request for such information. Or some storage managers may not be set up to receive unsolicited information, and might only be able to process the streaming capabilities of a storage device after requesting the streaming capabilities from the storage device. In such embodiments of the inventive concept, receiver 505 may receive the request from storage manager 135 of FIG. 1 before controller 410 performs the self-inventory of storage device 120 of FIG. 1. (Receiver 505 may be used for other purposes—such as to receive read and write requests from applications—and so would likely be part of controller 410 regardless. But receiver 505 is not necessary for streaming capabilities management in all embodiments of the inventive concept.)

Streaming capabilities analyzer 510 may determine the streaming capabilities of storage device 120 of FIG. 1. That is, streaming capabilities analyzer 510 may inventory storage device 120 of FIG. 1 and determine what capabilities and limitations storage device 120 of FIG. 1 has. Examples of the capabilities and limitations that may be inventoried are discussed further with reference to FIG. 6 below. This information may then be provided to storage manager 135 of FIG. 1 via transmitter 515, enabling storage manager 135 of FIG. 1 to select the optimal device stream/storage device for a particular request from an application.

Update detector 520 may detect when the streaming capabilities of storage device 120 of FIG. 1 have been changed. When the streaming capabilities of storage device 120 of FIG. 1 have been changed, streaming capabilities analyzer 510 and transmitter 515 may perform their functions anew to provide an updated streaming capabilities to storage manager 135 of FIG. 1. The streaming capabilities of storage device 120 of FIG. 1 might change for any number of reasons. For example, storage device 120 of FIG. 1 might allocate one of its device streams 425-1 through 425-3 of FIG. 4 to a particular application or software stream, in which case that device stream is not generally available any more. Storage device 120 of FIG. 1 may then update its reported streaming capabilities to storage manager 135, indicating that storage device 120 of FIG. 1 now offers one fewer device stream.

As another example of a reason why storage device 120 of FIG. 1 might update its streaming capabilities, consider a storage device that has built-in auto-streaming capability: that is, a storage device that performs its own (internal) streaming. For such a storage device, storage manager 135 of FIG. 1 might not need to specify a particular stream for a request sent to that storage device, but instead could just rely on the auto-streaming capabilities of the storage device to manage stream assignment. If the parameters that control how the storage device performs auto-streaming change, this change might impact whether storage manager 135 of FIG. 1 would want to rely on the storage device's auto-streaming capability. By reporting this change, storage manager 135 of FIG. 1 is kept abreast of the current streaming capabilities of the storage device, enabling storage manager 135 to better select appropriate device streams/storage devices for requests. For example, the changes in the storage device's auto-streaming capability might mean that storage manager 135 of FIG. 1 should no longer rely on the storage device's auto-streaming capability and instead assign streams itself.

Other examples of reasons why storage device 120 of FIG. 1 might update its streaming capabilities may be for changes in either the physical device itself or its connection to host machine 105 of FIG. 1. For example, if storage device 120 of FIG. 1 is an Ethernet SSD that uses Ethernet for a primary connection and uses Peripheral Component Interconnect Express (PCIe) as a secondary connection (for example, as a command plane) and the Ethernet connection fails, storage device 120 of FIG. 1 may switch to the PCIe connection for data communication. This change in the connection to host machine 105 of FIG. 1 may affect how storage device 120 of FIG. 1 may be used (such as reduced bandwidth).

Note that the specifics of how the streaming capabilities are reported to storage manager 135 of FIG. 1 have not been discussed. This is by design. Embodiments of the inventive concept are concerned with the information being reported from storage device 120 of FIG. 1 to storage manager 135 of FIG. 1; the format in which the data is presented to storage manager 135 of FIG. 1 is of lower concern. U.S. patent application Ser. No. 15/653,479, filed Jul. 18, 2017, now pending, which claims the benefit of U.S. Provisional Patent Application Ser. No. 62/484,387, filed Apr. 11, 2017, both of which are incorporated by reference herein for all purposes, describes one way in which storage device 120 of FIG. 1 may report its streaming capabilities to storage manager 135 of FIG. 1, but embodiments of the inventive concept may support other mechanisms by which storage device 120 of FIG. 1 may report its streaming capabilities to storage manager 135 of FIG. 1. Provided there is some way to report the information to storage manager 135 of FIG. 1, the specific approach used to make that report is not pertinent.

Controller 410 may perform the self-inventory of storage device 120 of FIG. 1 at start-up. As noted by the presence of update detector 520, controller 410 may also perform a self-inventory of storage device 120 of FIG. 1 at other times, such as when an update is detected. Controller 410 may also perform a self-inventory of storage device 120 of FIG. 1 even when no change has been detected. Controller 410 may perform a periodic self-inventory of storage device 120 of FIG. 1: for example, once every day (or at any other desired interval). This period may be measured using a timer (not shown in FIG. 5), which may trigger the operation of streaming capabilities analyzer 510 and transmitter 515 when the timer has completed measuring the period.

Figure 6:
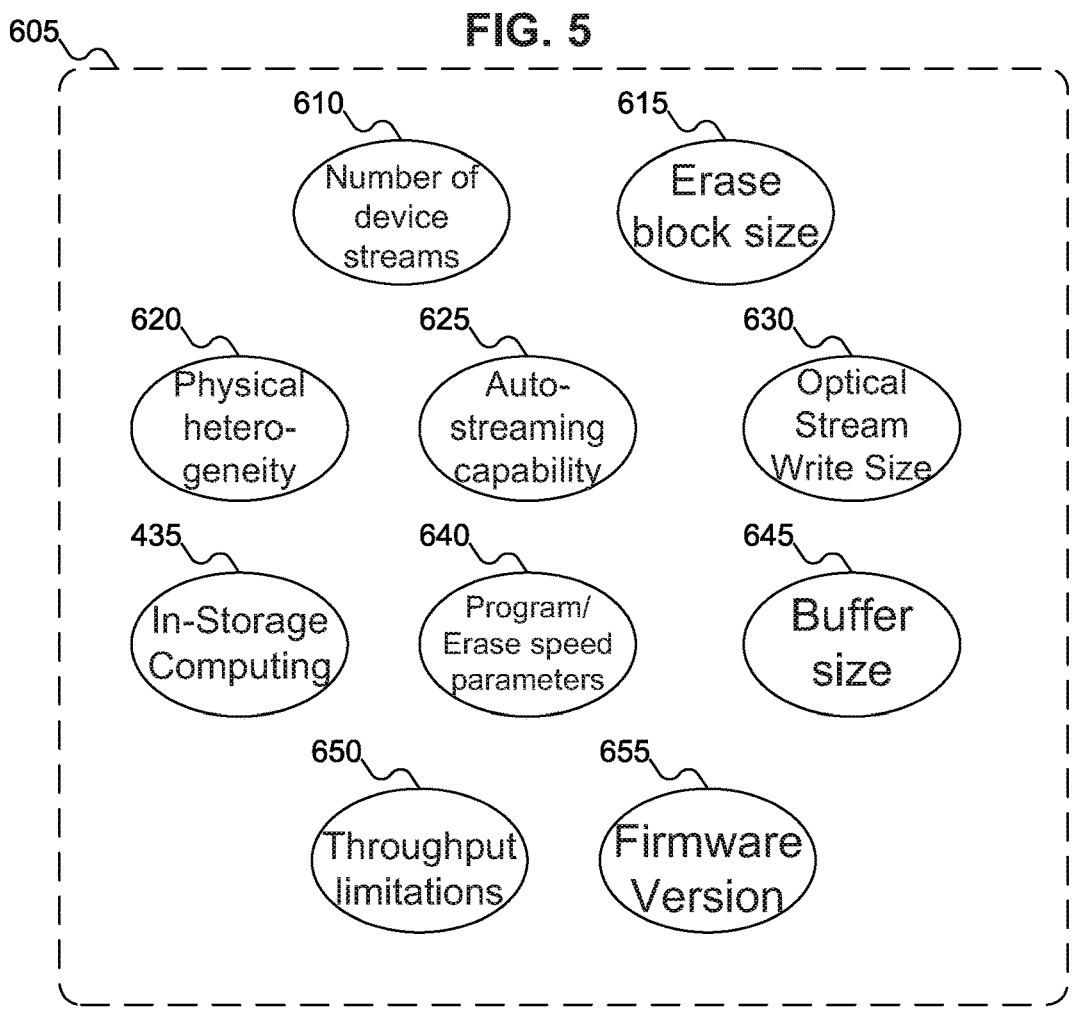
FIG. 6 shows various streaming capabilities that may be reported by the storage device of FIG. 1 to the storage manager of FIG. 1.

FIG. 6 shows various streaming capabilities that may be reported by storage device 120 of FIG. 1 to storage manager 135 of FIG. 1. In FIG. 6, streaming capabilities 605 include various capabilities. These include:

Number 610 Of Device Streams: how many device streams 425 of FIG. 4 storage device 120 of FIG. 1 supports.

Erase Block Size 615: the size of erase blocks in storage device 120 of FIG. 1 (assuming that storage device 120 of FIG. 1 performs garbage collection or a similar operation).

Physical Heterogeneity 620: what different types of storage are available within storage device 120 of FIG. 1. For example, in FIG. 4, flash memory chips 415-1, 415-2, 415-5, and 415-6 are SLCs whereas flash memory chips 415-3, 415-4, 415-7, and 415-8 are MLCs. If all storage within storage device 120 of FIG. 1 is the same, then there is little or no difference regardless of where in storage device 120 of FIG. 1 the data is written. But if storage device 120 of FIG. 1 supports different types of storage, then where the data is actually written may have an impact on the performance of storage device 120 of FIG. 1.

Auto-Streaming Capability 625: whether storage device 120 of FIG. 1 supports auto-streaming, and the parameters of auto-streaming supported by storage device 120 of FIG. 1. If storage device 120 of FIG. 1 supports auto-streaming and the auto-streaming parameters are useful, storage manager 135 of FIG. 1 might defer to storage device 120 of FIG. 1 to perform internal auto-streaming rather than imposing a selected device stream from outside.

Optimal Stream Write Size 630: whether storage device 120 of FIG. 1 has an optimal or substantially optimal stream write size. Optimal Stream Write Size 630 may relate to various constraints of storage device 120, such as the flash-block page size, buffer size, the number of streams concurrently operating on storage device 120, and bandwidth consumed by those streams, among other factors.

In-Storage Computing 635: whether storage device 120 of FIG. 1 offers in-storage computing, and if so the in-storage computing capabilities, such as the number of processors, the number of instructions per second of each processor, the amount of available memory for storing data used by applications running on the in-storage computing processors, etc.

Program/Erase Speed Parameters 640: the parameters of how storage device 120 of FIG. 1 performs garbage collection (assuming storage device 120 of FIG. 1 performs garbage collection). These parameters may include the time required to Erase an erase block, the average time required to Program valid data from an erase block, and the like. Note that these parameters may include Erase Block Size 615.

Buffer Size 645: the size of the buffer included in storage device 120. Note that buffer size 645 may include additional related buffer information: for example, whether the buffer is partitioned among the offered device streams 425 of FIG. 4 (or a namespace), or if the buffer is shared across device streams 425 of FIG. 4 (or namespaces).

Throughput Limitations 650: limitations of storage device 120 of FIG. 1: for example, available bandwidth or latency.

Firmware Version 655: the version of the firmware of storage device 120 of FIG. 1 (which has an impact on the operation of device streams 425-1 through 425-3 of FIG. 4).

The factors shown in FIG. 6 represent only a small subset of factors that may affect the streaming capabilities of storage device 120 of FIG. 1. For example, the free block count of storage device 120 of FIG. 1 (or, relatedly, how full storage device 120 of FIG. 1 is as a percentage) may indicate whether storage device 120 of FIG. 1 will need to perform Garbage Collection in the near future, and to what extent, which may also affect (at least in the short term) the streaming capabilities of storage device 120 of FIG. 1. U.S. patent application Ser. No. 15/653,479, filed Jul. 18, 2017, now pending, which claims the benefit of U.S. Provisional Patent Application Ser. No. 62/484,387, filed Apr. 11, 2017, both of which are incorporated by reference herein for all purposes, lists numerous other information about storage device 120 of FIG. 1 that may be reported, which may affect the performance (and therefore the streaming capabilities) of storage device 120 of FIG. 1. All of these factors are considered to be part of streaming capabilities 605 of FIG. 6, and therefore may be subject to reporting to storage manager 135 of FIG. 1.

Figure 7:
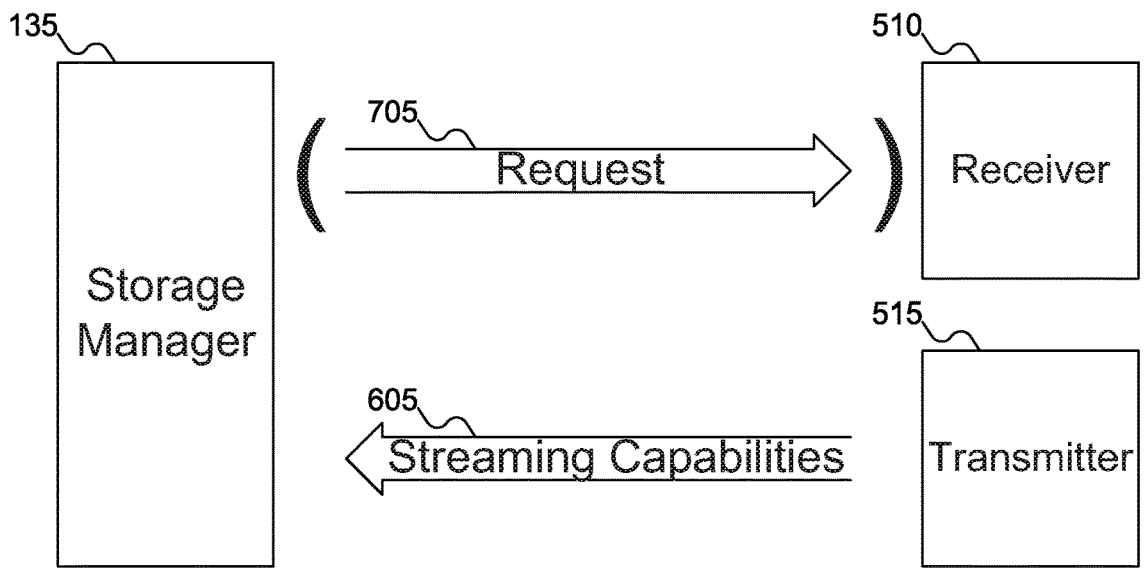
FIG. 7 shows the storage device of FIG. 1 communicating the streaming capabilities of FIG. 6 to the storage manager of FIG. 1.

FIG. 7 shows storage device 120 of FIG. 1 communicating streaming capabilities 605 of FIG. 6 to storage manager 135 of FIG. 1. In FIG. 7, storage manager 135 may send request 705 to storage device 120, requesting streaming capabilities 605 from storage device 120; in response, storage device 120 may then send streaming capabilities 605 back to storage manager 135. Note that storage device 120 may send streaming capabilities 605 to storage manager 135 without being prompted to do so: request 705 may be optional, which explains why request 705 is shown in parenthesis.

In the above discussion, it is assumed that storage manager 135 wants to know all streaming capabilities of storage device 120 of FIG. 1. While this assumption is reasonable, as it gives storage manager 135 maximum information with which to select device streams/storage devices for software requests, storage manager 135 might rely on only some of the streaming capabilities of storage device 120 of FIG. 1. In that situation, request 705 may specify which streaming capabilities storage manager 135 is specifically interested in, and storage device 120 of FIG. 1 may then report just those streaming capabilities of interest to storage manager 135.

Figure 8:
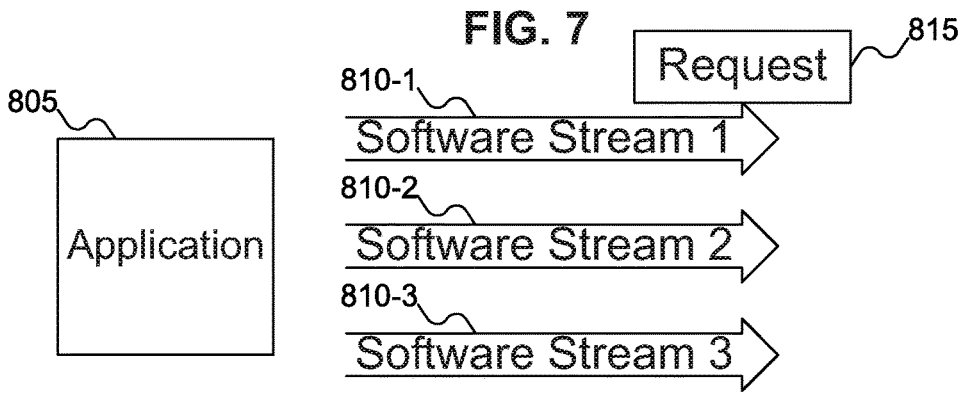
FIG. 8 shows an application running on the machine of FIG. 1 sending requests via software streams.

FIG. 8 shows an application running on machine 105 of FIG. 1 sending requests via software streams. In FIG. 8, application 805 is shown. Application 805 may specify any number of software streams: FIG. 8 shows three software streams 810-1 through 810-3. Associated with each stream may be requests, such as request 805.

Figure 9:
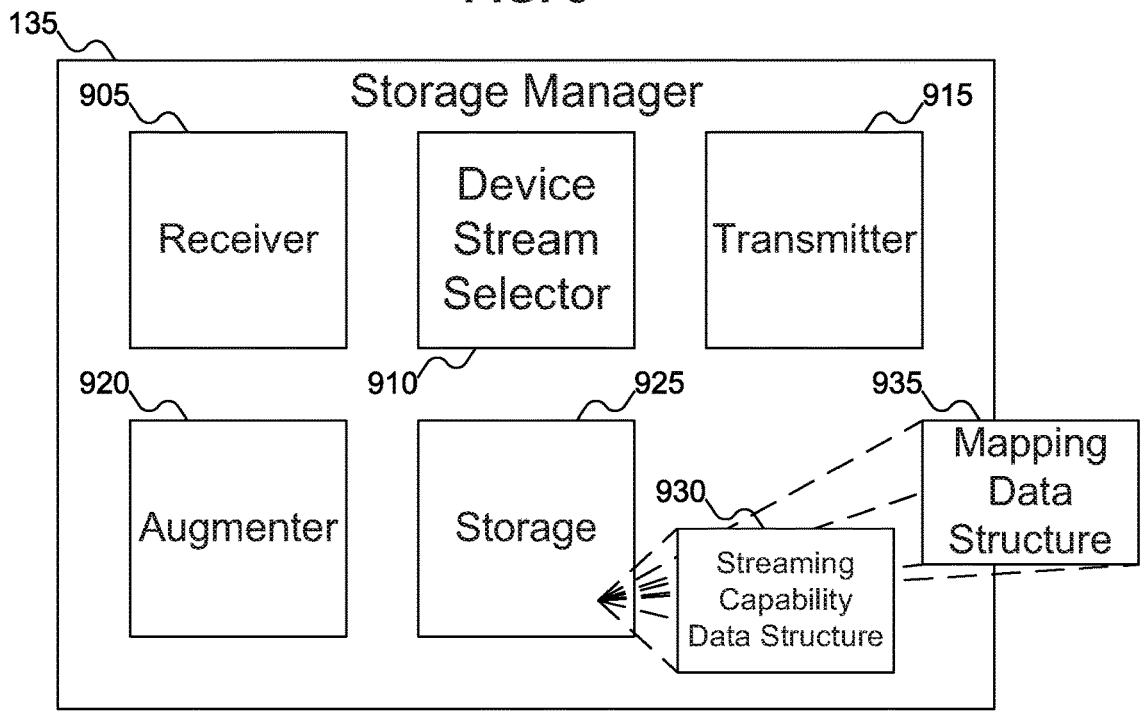
FIG. 9 shows details of the storage manager of FIG. 1.

FIG. 9 shows details of storage manager 135 of FIG. 1. In FIG. 9, storage manager 135 may include receiver 905, device stream selector 910, and transmitter 915. Receiver 905 may receive streaming capabilities 605 of FIG. 6 from storage device 120 of FIG. 1. Receiver 905 may also receive requests 805 of FIG. 8 from applications on machine 105 of FIG. 1. Device stream selector 910 may select a device stream from device streams 425 for request 805 of FIG. 8. Transmitter 915 may then transmit request 805 of FIG. 8 to the selected storage device 120 of FIG. 1, specifying the selected device stream.

While streaming capabilities 605 of FIG. 6 provide useful information about the capabilities of storage device 120 of FIG. 1, certain factors that may affect streaming are not necessarily known by storage device 120 of FIG. 1. For example, the time required to communicate with storage device 120 (if storage device 120 of FIG. 1 is not within machine 105 of FIG. 1) is not something that storage device 120 of FIG. 1 would know. Therefore, storage manager 135 may also include augmenter 920. Augmenter 920 may augment streaming capabilities 605 of FIG. 6 with storage device-independent considerations, which storage manager 135 (or some other component within machine 105 of FIG. 1) may measure. Augmenter 920 may measure the time required to communicate between storage manager 135 and storage device 120 of FIG. 1, or the bandwidth along the connection between processor 110 of FIG. 1 and storage device 120 of FIG. 1, among other possibilities. Storage manager 135 may then add this information determined by augmenter 920 to streaming capabilities 620 of FIG. 6, to provide additional information about storage device 120 of FIG. 1.

Finally, storage manager 135 may include storage 925. Storage 925 may store information, such as streaming capabilities data structure 930, which may store streaming capabilities 605 of FIG. 6 from each storage device 120 of FIG. 1.

In some embodiments of the inventive concept, device stream selector 910 may receive individual requests from applications and select the appropriate device streams as storage manager 135 receives each request. But in other embodiments of the inventive concept, device stream selector 910 may determine, in advance, which device stream should be used for requests associated with individual software streams. In such embodiments of the inventive concept, storage 925 may store mapping data structure 935, which maps software streams to device streams.

FIGS. 10A-10B show example data structures 930 and 935 of FIG. 9 to store streaming capabilities 605 of FIG. 6 of storage device 120 of FIG. 1 and related information. In FIG. 10A, table 1005 is shown; in FIG. 10B, table 1010 is shown.

Table 1005 is an example of data structure 930 that may store streaming capabilities 605 of FIG. 6 of storage device 120 of FIG. 1. The information shown in table 1 is merely an example: embodiments of the inventive concept may support any number of storage devices, any number of streams per storage device (or per media type), and any other parameters per storage device (or per media type).

In table 1005 of FIG. 10A, devices may be identified by device identifier (ID), and the associated stream IDs may also be stored. Note that while the storage devices with device IDs 1 and 2 are physically homogeneous—the storage device with device ID 1 offers just SMR, whereas the storage device with device ID 2 offers just MLC—the storage device with device ID 3 is physically heterogeneous: that is, that storage device has multiple different media types: specifically, SLC and MLC media. As such, the different media types may merit their own separate entries in table 1005.

Aside from the fact that the storage device with device ID 3 includes multiple media types, table 1005 also indicates other pertinent factors in selecting storage devices for streaming. The storage device with device ID 3 supports in-storage computing; the storage devices with device IDs 1 and 2 do not. The storage devices with device IDs 2 and 3 support tail latency management; the storage device with device ID 1 does not. The storage device with device ID 1 uses a 6 GB SAS connection; the storage device with device ID 2 uses a 10 GB Ethernet connection; the storage device with device ID 3 uses a four lane PCIe connection. The storage device with device ID 1 has a 64 MB Garbage Collection erase block size; the storage devices with device IDs 2 and 3 offering MLC media have a 4 MB Garbage Collection erase block size; the storage device with device ID 3 offering SLC media has a 1 MB Garbage Collection erase block size. All three storage devices have varying Garbage Collection latency, from low for the SLC media of the storage device with device ID 3 to very high for the storage device with device ID 1 (note that rather than using arbitrary descriptors such as "low", "medium", "high", and "very high", the numeric latencies could be used instead). All three storage devices also offer different buffer sizes: the storage device with device ID 3 shares its 1 GB buffer between both the SLC and MLC media.

In some embodiments of the inventive concept, storage devices may be associated with namespaces. While not shown in FIGS. 10A-10B, such embodiments of the inventive concept permit a finer granularity of information in table 1005.

Table 1010 of FIG. 10B is an example of data structure 935 that may store streaming-related information, as might be used in the mapping from software streams 810-1 through 810-3 of FIG. 8 to device streams 425-1 through 425-3 of FIG. 4. In table 1010, various use cases are shown: long-term storage (where the data is not expected to change frequently), in-storage computing operations (which may need fast access to data that changes frequently), and high throughput (where speed of access is considered important). Associated with each use case are the selected streams from the various storage devices, and the weights used in identifying the selected streams for each use case, with the weights corresponding to the columns in table 1005.

In general, weights may be assigned values between 0 and 1, reflecting the relative priority of that streaming capability relative to the rank of the storage devices according to that streaming capability (although embodiments of the inventive concept may use weights of any desired value and/or range). For any given streaming capability, the closer a weight is to 0, the more important that streaming capability is considered.

Each storage device may be ranked according to each streaming capability. Using Garbage Collection latency as an example, the SLC media of the storage device with device ID 3 may be assigned rank 1, while the storage device with the device ID 1 may be assigned rank 4. Since lower numbers are considered better, the closer a weight is to 0, the more important that streaming capability is considered to be.

Some streaming capabilities, like Garbage Collection latency, may be ranked the same way in all use cases. For example, the greater the amount of time needed to perform garbage collection, the worse the performance of the storage device (for that capability). For some use cases, this consideration might not be important; for other use cases, this consideration might be very significant. But regardless of how significant the capability is, the storage devices may be ranked the same way according to the capability.

On the other hand, some streaming capabilities may vary with the use case. For example, consider the media type for each of the storage devices shown in table 1005 of FIG. 10A. The storage device with the device ID 1 offers Shingled Magnetic Recording, the storage device with the device ID 2 offers Multi-Level Cells, and the storage device with the device ID 3 offers both Single Level Cells and Multi-Level Cells. These different media have different characteristics, which affects whether they are good or poor choices for storing data in different situations. Although any media type may be used to store data for any use case, certain media types are likely to be a better "fit" than others in different use cases: it is unlikely that any particular media type is considered optimal for all use cases (although a single media type might be optimal for all uses cases in a particular environment, depending on the use cases needed). Thus, for long-term data storage, Shingled Magnetic Recording may be preferable to either Single Level Cells or Multi-Level Cells, whereas for in-storage computing and high throughput use cases, Single Level Cells may be preferred.

To properly weight the storage devices according to media type therefore requires a different approach than simply ranking the storage devices. One possibility would be determine the ranks for the storage devices based on the use case in question. For example, the storage devices may be ranked in the order device IDs 1, 2, and 3 for the long-term storage use case, and ranked in the order device IDs 3, 2, and 1 for the other use cases. Another possibility is simply to treat all storage devices as having an equal "rank" and apply different weights to the different media types. For example, in the long-term storage use case, a lower value, such as 0.25, which indicates a higher weight, may be provided for Shingled Magnetic Recording, and Single Level Cells and Multi-Level Cells may be given higher values (i.e., lower weights), such as 0.5 and/or 0.75. Conversely, Single Level Cells may be given a lower value (higher weight), such as 0.25, for the in-storage computing and high throughput use cases, and Multi-Level Cells and Shingled Magnetic Recording may be given higher values (i.e., lower weights), such as 0.5 and/or 0.75. (The values shown for the various media types are merely example values, and any desired values may be used in their place.) Using either approach, the best storage device for a particular use case may be determined, factoring in how the media type interplays with the use case.

Once all the weights and ranks are known for the storage devices for each capability, for each use case, a weighted sum of each storage device's rank for each streaming capability may be calculated. The storage device with the lowest weighted sum may then be selected as the optimal storage device for a particular use case.

Note that the manner in which the storage devices are ranked for a particular streaming capability may make a difference in how the weights are assigned. For example, if the storage devices are ranked from lowest Garbage Collection latency to highest Garbage Collection latency, then a fast Garbage Collection would be favored by a lower weight that is positive in value. If the storage devices are ranked from the highest Garbage Collection latency to the lowest Garbage Collection latency, then a fast Garbage Collection might require a negative weight that has a larger absolute value.

For the long-term storage use case, device streams 0-3, from the storage device with device ID 1, have been selected. SMR media is favored over either MLC or SLC media, in-storage computing and tail latency management are considered low priorities, whereas Garbage Collection latency is considered a high priority. Note the weight of 0 for connection, Garbage Collection erase block size, and buffer size: these criteria are not considered important at all and may be ignored for this use case.

For the in-storage computing use case, device streams 12-13, from the storage device with device ID 3, have been selected. Note the use of −100 as the weight for the in-storage computing capability: this "large" negative value emphasizes that this streaming capability is a "must have" criteria. After all, if a storage device does not have in-storage computing capability, then that storage device may not support the in-storage computing use case. But the weights for the other streaming capabilities may still matter, if there is more than one storage device that offers in-storage computing. Thus, the remaining weights show that SLC media is favored over MLC media, which is favored over SMR media, tail latency management and Garbage Collection latency are considered important, Garbage Collection erase block size and buffer size are considered to be of low importance, and the connection type is considered irrelevant.

For the high throughput use case, device streams 4-11, from the storage device with device ID 2, have been selected. The weights indicate that in-storage computing and Garbage Collection latency are considered to be important, Garbage Collection erase block size and connection type are considered of medium importance, and tail latency management and buffer size are of low importance.

The weights used in identifying the appropriate storage device for a particular software stream (either directly or through a use case as described above) may be determined either by storage manager 135 of FIG. 1 or application 805 of FIG. 8. That is, application 805 of FIG. 8 may specify the weights to use for particular requirements of the software stream, or storage manager 135 of FIG. 1 may select the appropriate weights to use in selecting the device stream based on the operation being performed. For example, if the data is being written for long-term storage, a different set of weights might be applied than if the data requires fast access and frequent change. Weights may also be set (or adjusted) based on additional information. For example, application 805 of FIG. 8 might set its desired weights, but based on a promised Quality of Service (QoS) offered by machine 105 of FIG. 1 (or based on what application 805 of FIG. 8 is paying for) the weights may be adjusted up or down to reflect a target QoS. If the weights are provided by application 805 of FIG. 8, then if multiple application streams 810-1 through 810-3 (or application streams for different applications 805) each request the same device streams from the same storage device 120 of FIG. 1 (or request enough device streams from a stream pool to exceed the capacity of the stream pool, as described below), the application stream with the better weighted sum may be allocated the requested device stream, with the other application stream allocated a less optimal device stream: for example, a device stream associated with a less optimal device, or a less optimal stream pool.

Another way application-provided weights may be determined is by considering the consequences of allocating each of the conflicting application streams the requested device stream: specifically, the consequences to the other application stream, which would be assigned a less-optimal device stream. For example, consider the situation where one application needs a very low latency device stream, and the other application simply prefers a Single Level Cell storage. Using table 1005 of FIG. 10A, both of these application streams would be directed toward the storage device with device ID 3, stream IDs 12-13. But while the second application stream might prefer Single Level Cells, it might make do with Multi-Level Cells, using stream IDs 4-11 or 14-17. But only stream IDs 12-13 offer the low latency needed by the first application stream. If the first application stream were not allocated one of stream IDs 12-13, the first application stream might be significantly negatively impacted. Thus, by comparing the magnitude of the impact to an application stream not being assigned its preferred stream, an application stream might be allocated to its preferred device stream even though based on the weighted sum another application ought to be allocated that device stream.

Note that typically only one of tables 1005 and 1010 is stored. Given the information in one of the tables, the information in the other table may (at least partially) be derived.

Figure 11:
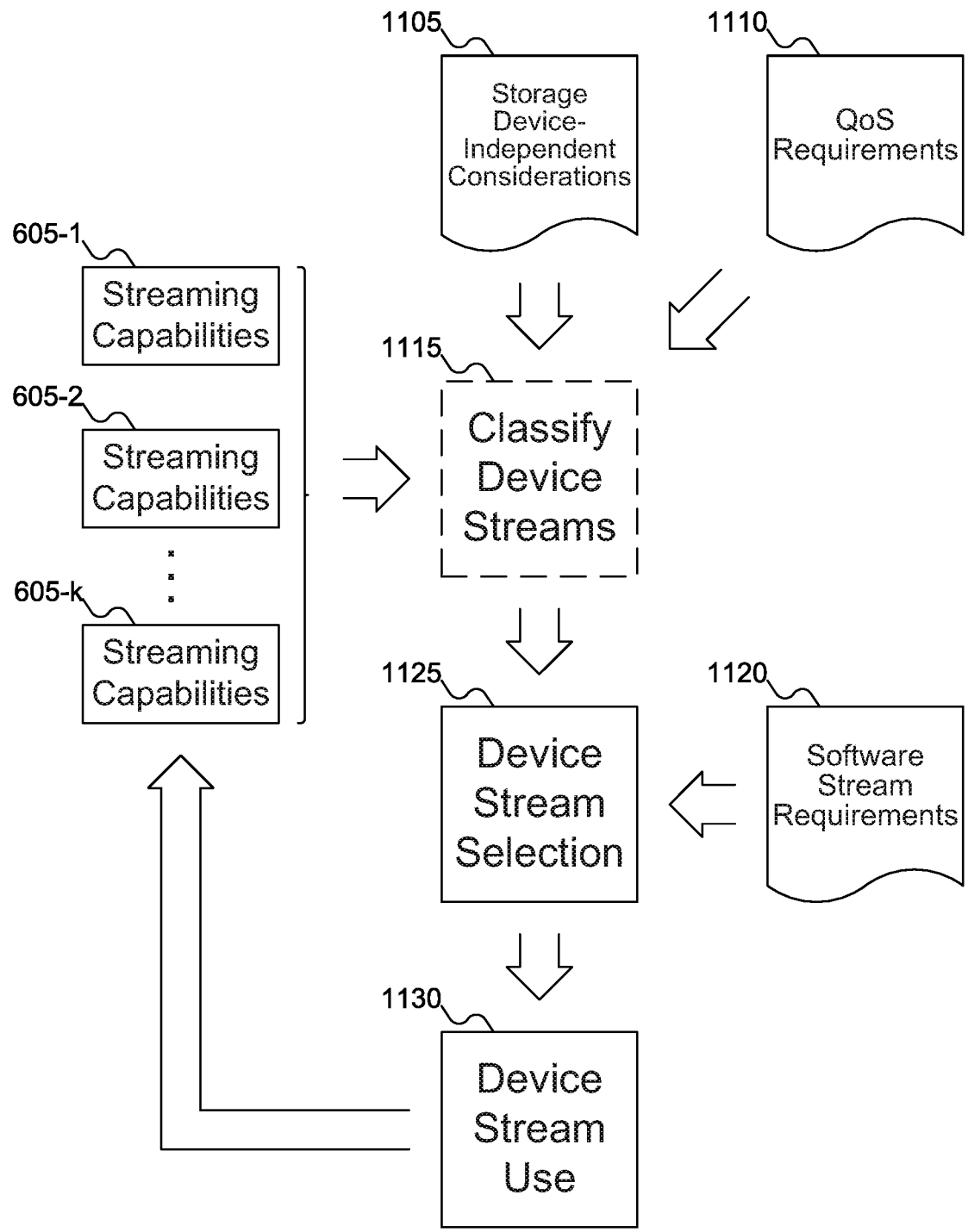
FIG. 11 shows a flow diagram of the operation of an example mechanism by which the storage manager of FIG. 1 may assign streams to applications.

FIG. 11 shows a flow diagram of the operation of an example mechanism by which storage manager 135 of FIG. 1 may assign streams to applications. In FIG. 11, storage manager 135 of FIG. 3 may receive streaming capabilities 605-1 through 605-3 from storage devices 120 of FIG. 1. In combination with storage device-independent considerations 1105—such as network latency for storage devices not located within machine 105 of FIG. 1—and QoS requirements 1110 of software streams 810-1 through 810-3 of FIG. 8, storage manager 135 of FIG. 1 may classify device streams 1115 into classes (or pools) of streams offering differing capabilities. For example, some device streams may be classified as high performance streams, where the response is faster (for example, the stream is assigned a higher priority for processing within storage device 120 of FIG. 1, or the stream operates with higher bandwidth, or with lower latency, among other possibilities), whereas other streams may be classified as lower performance stream (for example, the stream is offered by an older storage device, or the stream is supported by a storage device that uses a slower connection or a less reliable connection).

There may be any number of classes: embodiments of the inventive concept do not limit device streams to be classified as "higher performance" or "lower performance". Storage manager 135 of FIG. 1 may establish any desired number of classes, although typically there will be fewer classes than there are different storage devices and media types. Classes are not necessarily mutually exclusive: a particular stream supported by a storage device may be assigned to more than one class, depending on its possible uses (for example, a high performance stream may also be a stream that supports in-storage computing). Of course, if a stream is assigned to more than one class, then if that stream is allocated to a specific use, it would need to be removed from all classes (to avoid attempting to use that stream again).

Once device streams 425-1 through 425-3 of FIG. 4 are classified, then in response to software stream requirements 1120, storage manager 135 of FIG. 1 may select device streams 1125 for software streams 810-1 through 810-3 of FIG. 8. Storage manager 135 of FIG. 1 may use 1130 device streams 425-1 through 425-3 of FIG. 4. Use 1130 of device streams 425-1 through 425-3 of FIG. 4 may then result in feedback that affects streaming capabilities 605-1 through 605-3, which may then be provided again to streaming manager 135 of FIG. 1, potentially changing how streaming manager 135 of FIG. 1 may use device streams 425-1 through 425-3 of FIG. 4 in the future.

Note that classifying streams 1115 is optional. Storage manager 135 of FIG. 1 may select device streams 425-1 through 425-3 of FIG. 4 for software streams 810-1 through 810-3 of FIG. 8 without classifying device streams 425-1 through 425-3 of FIG. 4 first.

Figure 12:
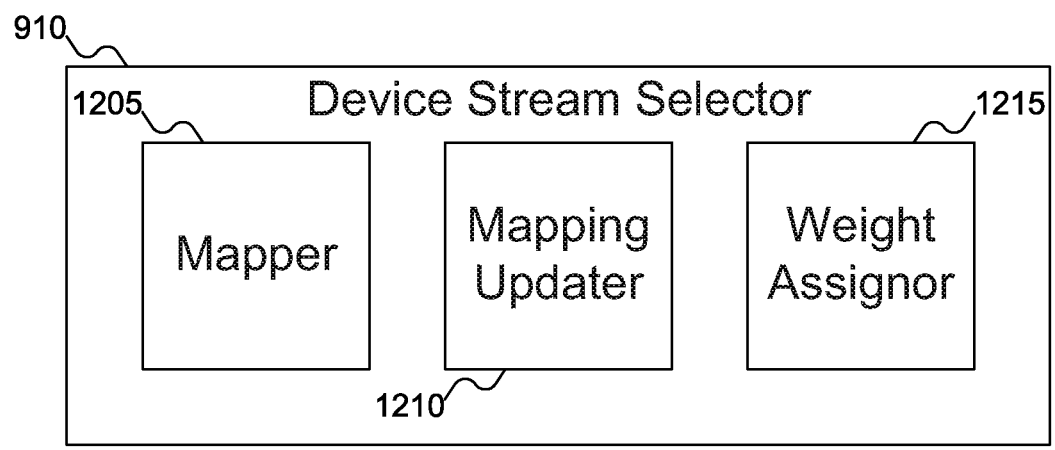
FIG. 12 shows details of the device stream selector of FIG. 9.

FIG. 12 shows details of device stream selector 910 of FIG. 9. In FIG. 12, device stream selector 910 may include mapper 1205, mapping updater 1210, and weight assignor 1215. Mapper 1205 may take streaming capabilities 605 of FIG. 6 and match them up with software streams 810-1 through 810-3 of FIG. 8. Mapping updater 1210 may determine that streaming capabilities 605 of FIG. 6 have changed and update them accordingly. (Alternatively, when streaming capabilities 605 of FIG. 6 have changed, mapper 1205 may simply be re-invoked to recreate streaming capabilities 605 of FIG. 6 for storage device 120 of FIG. 1.) And weight assignor 1215 may assign weights to software stream requirements 1120 for software streams 810-1 through 810-3 of FIG. 8 to be used in selecting device streams 425-1 through 425-3 of FIG. 4 for software streams 810-1 through 810-3 of FIG. 8. Weight assignor 1215 may assign weights from any source. For example, the weights might come from a user for a particular use case, or from a file that stores weights for streaming capabilities for various use cases.

Figure 13:
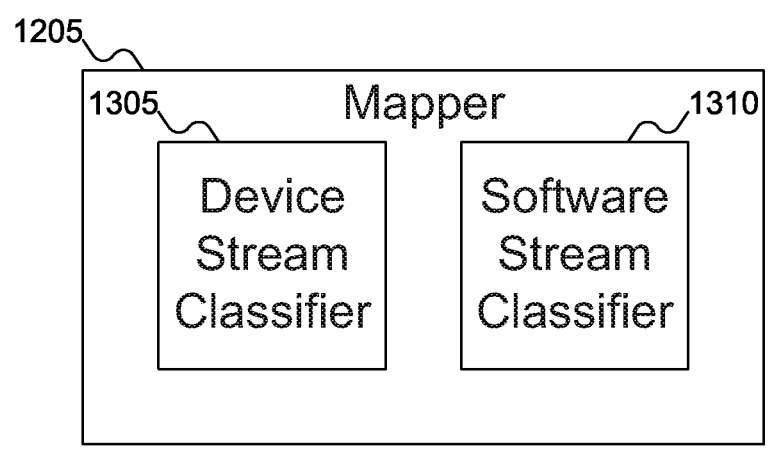
FIG. 13 shows details of the mapper of FIG. 12.

FIG. 13 shows details of mapper 1205 of FIG. 12. As discussed above, in some embodiments of the inventive concept, storage manager 135 of FIG. 1 may classify device streams 425-1 through 425-3 of FIG. 4 and software streams 810-1 through 810-3 of FIG. 8. FIG. 13 represents the operation of mapper 1205 in such embodiments of the inventive concept. Mapper 1205 may include device stream classifier 1305 and software stream classifier 1310. Device stream classifier 1305 may classify device streams 425-1 through 425-3 of FIG. 4 into classes or pools, and software stream classifier 1310 may similarly classify software streams 810-1 through 810-3 of FIG. 8 into classes. This permits mapper 1205 to match software streams 810-1 through 810-3 of FIG. 8 with device streams 425-1 through 425-3 of FIG. 4 based on corresponding classes.

Embodiments of the inventive concept offer several technical advantages over conventional systems. First, by providing storage manager 135 of FIG. 1 with more information about the streaming capabilities of storage devices 120 of FIG. 1, storage manager 135 of FIG. 1 may manage streaming even across multiple media types (either within or across storage devices). Second, storage manager 135 of FIG. 1 may make better use of storage device 120 of FIG. 1. For example, application 805 of FIG. 8 may assign different profiles to different streams. In conventional systems, the data from application 805 of FIG. 8 would end up on storage devices 120-1 through 120-5 of FIG. 3, but without any organized placement and without consideration of the streaming characteristics of storage devices 120-1 through 120-5 of FIG. 3. But in embodiments of the inventive concept, data associated with different software streams 810-1 through 810-3 of FIG. 8 may be sent to specific different storage devices. This result avoids wasting high performance resources on data in a low performance stream. For example, data destined for long-term storage could be stored on a HDD rather than a flash memory storage device.

Figure 14:
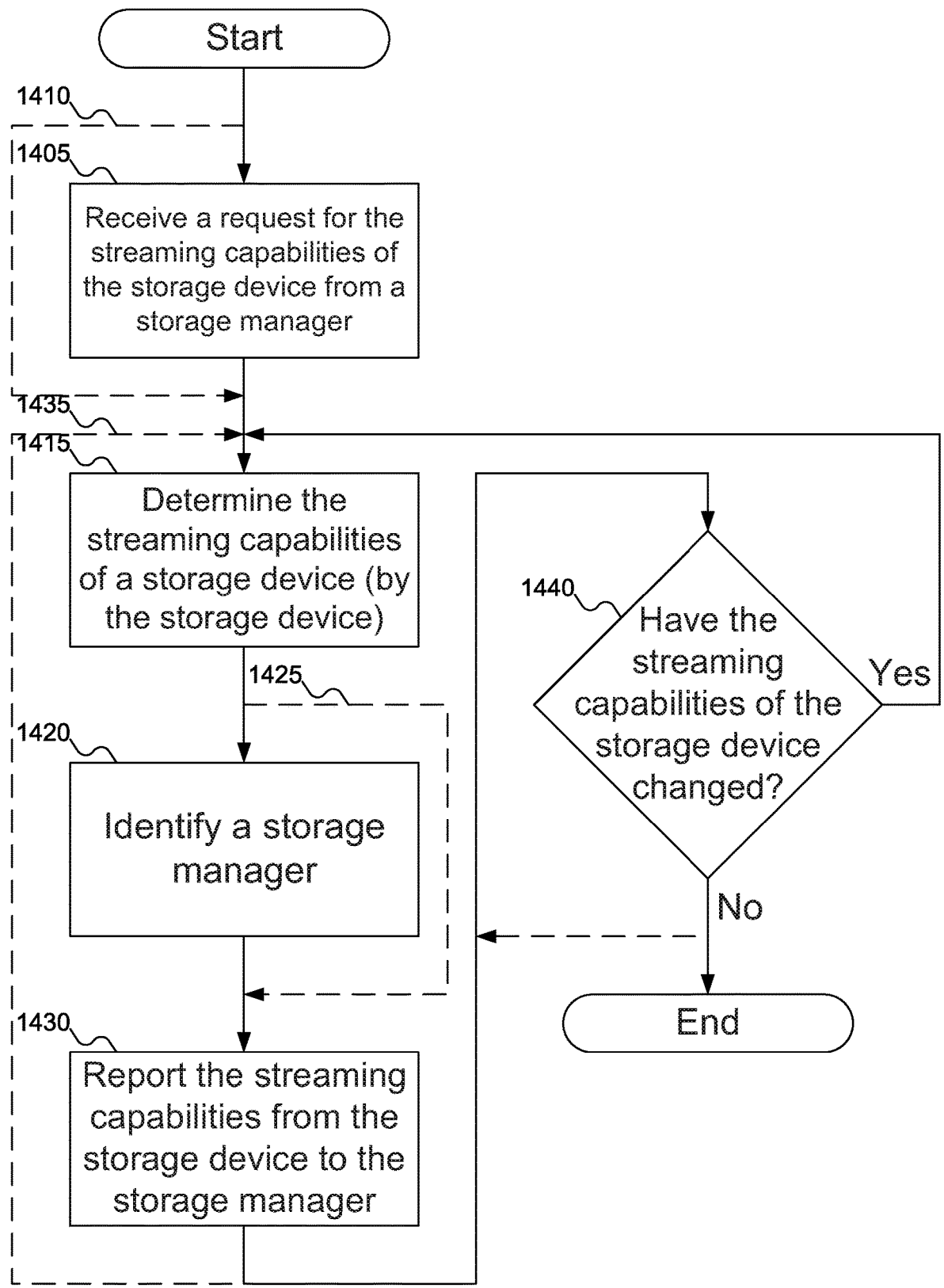
FIG. 14 shows a flowchart of an example procedure for the storage device of FIG. 1 to self-inventory its streaming capabilities and send that information to the storage manager of FIG. 1, according to an embodiment of the inventive concept.

FIG. 14 shows a flowchart of an example procedure for storage device 120 of FIG. 1 to self-inventory its streaming capabilities 605 of FIG. 6 and send that information to storage manager 135 of FIG. 1, according to an embodiment of the inventive concept. In FIG. 14, at block 1405, receiver 505 of FIG. 5 may receive request 705 of FIG. 7 from storage manager 135 of FIG. 1. Block 1405 is optional, as shown by dashed arrow 1410. At block 1415, streaming capabilities analyzer 510 of FIG. 5 may inventory streaming capabilities 605 of FIG. 6 of storage device 120 of FIG. 1. At block 1420, storage device 120 of FIG. 1 may identify a storage manager 135 of FIG. 1 that uses storage device 120 of FIG. 1. Block 1420 is optional, as shown by dashed line 1425. At block 1430, transmitter 615 of FIG. 6 may report streaming capabilities 605 of FIG. 6 to storage manager 135 of FIG. 1.

If storage device 120 of FIG. 1 self-inventories streaming capabilities 605 of FIG. 6 only once, then the flowchart may end. But as described above, there are situations in which storage device 120 of FIG. 1 might self-inventory streaming capabilities 605 of FIG. 6 more than once. In one example, storage device 120 of FIG. 1 might periodically repeat the self-inventory to determine the most correct streaming capabilities 605 of FIG. 6, which may then be reported to storage manager 135 of FIG. 1. In a second example, storage device 120 of FIG. 1 might detect that streaming capabilities 605 of FIG. 6 have changed, which would justify repeating the self-inventory and reporting to storage manager 135 of FIG. 1. This repetition of blocks 1415, 1420, and 1430 may be particularly pertinent where storage device 120 of FIG. 1 reports streaming capabilities 605 of FIG. 6 to multiple storage managers 135 of FIG. 1: the actions of one storage manager 135 of FIG. 1 might affect the other storage managers, but the other storage managers might not know about the change without storage device 120 of FIG. 1 reporting the change in streaming capabilities 605 of FIG. 6 to them. In a third example, as blocks 1415, 1420, and 1430 describe reporting streaming capabilities 605 of FIG. 6 to a single storage manager 135 of FIG. 1, storage device 120 of FIG. 1 might need to report streaming capabilities to more than one storage manager 135 of FIG. 1. (Although reporting streaming capabilities 605 of FIG. 6 to multiple storage managers 135 of FIG. 1 may be done by simply repeating blocks 1420 and 1430, without necessarily performing block 1415 multiple times, there might be situations in which block 1415 needs to be repeated as well: for example, if different storage managers 135 of FIG. 1 want different streaming capabilities 605 of FIG. 6 reported.)

If storage device 120 of FIG. 1 performs a periodic report of streaming capabilities 605 of FIG. 6, or if storage device 120 of FIG. 1 needs to report streaming capabilities 605 of FIG. 2 to multiple storage managers 135 of FIG. 1, then dashed line 1435 may be followed to perform the additional reports. Alternatively, if storage device 120 of FIG. 1 may determine whether streaming capabilities 605 of FIG. 6 have changed, then at block 1440 update detector 520 of FIG. 5 may perform such a check. If the check indicates that streaming capabilities 605 of FIG. 6 have changed, then control may return to block 1415 to repeat the self-inventory of streaming capabilities 605 of FIG. 6 and reporting that information to storage manager 135 of FIG. 1.

Figure 15:
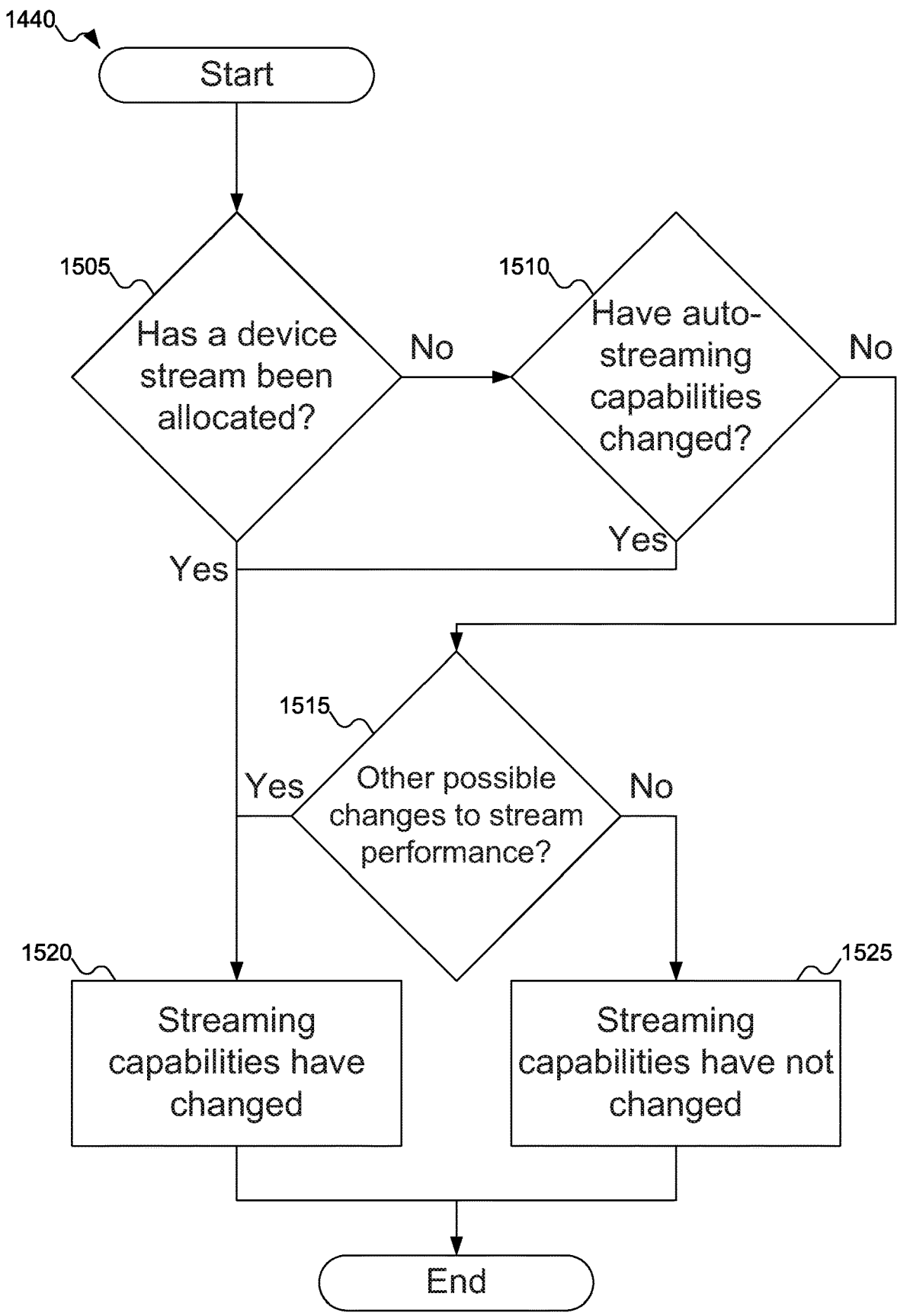
FIG. 15 shows a flowchart of an example procedure for the storage device of FIG. 1 to determine when its streaming capabilities have changed, according to an embodiment of the inventive concept.

FIG. 15 shows a flowchart of an example procedure for the storage device 120 of FIG. 1 to determine when its streaming capabilities 605 of FIG. 6 have changed, according to an embodiment of the inventive concept. In FIG. 15, at block 1505, update detector 520 of FIG. 5 may check to see if any of its device streams 425 of FIG. 4 have been allocated to a specific use (and therefore are not generally available). If not, then at block 1510, update detector 520 of FIG. 5 may check to see if its auto-streaming capabilities have changed. Auto-streaming may be an adaptive process, as storage device 120 of FIG. 1 determines how best to manage the data it receives, and therefore auto-streaming may change at any time. If not, then at block 1515, update detector 520 of FIG. 5 may check to see if any other streaming capabilities have changed: for example, storage device throughput, storage device read/write/erase latency, streams being allocated or de-allocated, large in-storage-compute jobs starting, among other possibilities. If any of these checks returns a positive result, then at block 1520, storage device 120 of FIG. 1 knows that its streaming capabilities 605 of FIG. 6 have changed. Otherwise, at block 1525, storage device 120 of FIG. 1 knows that its streaming capabilities 605 of FIG. 6 have not changed.

Figure 16:
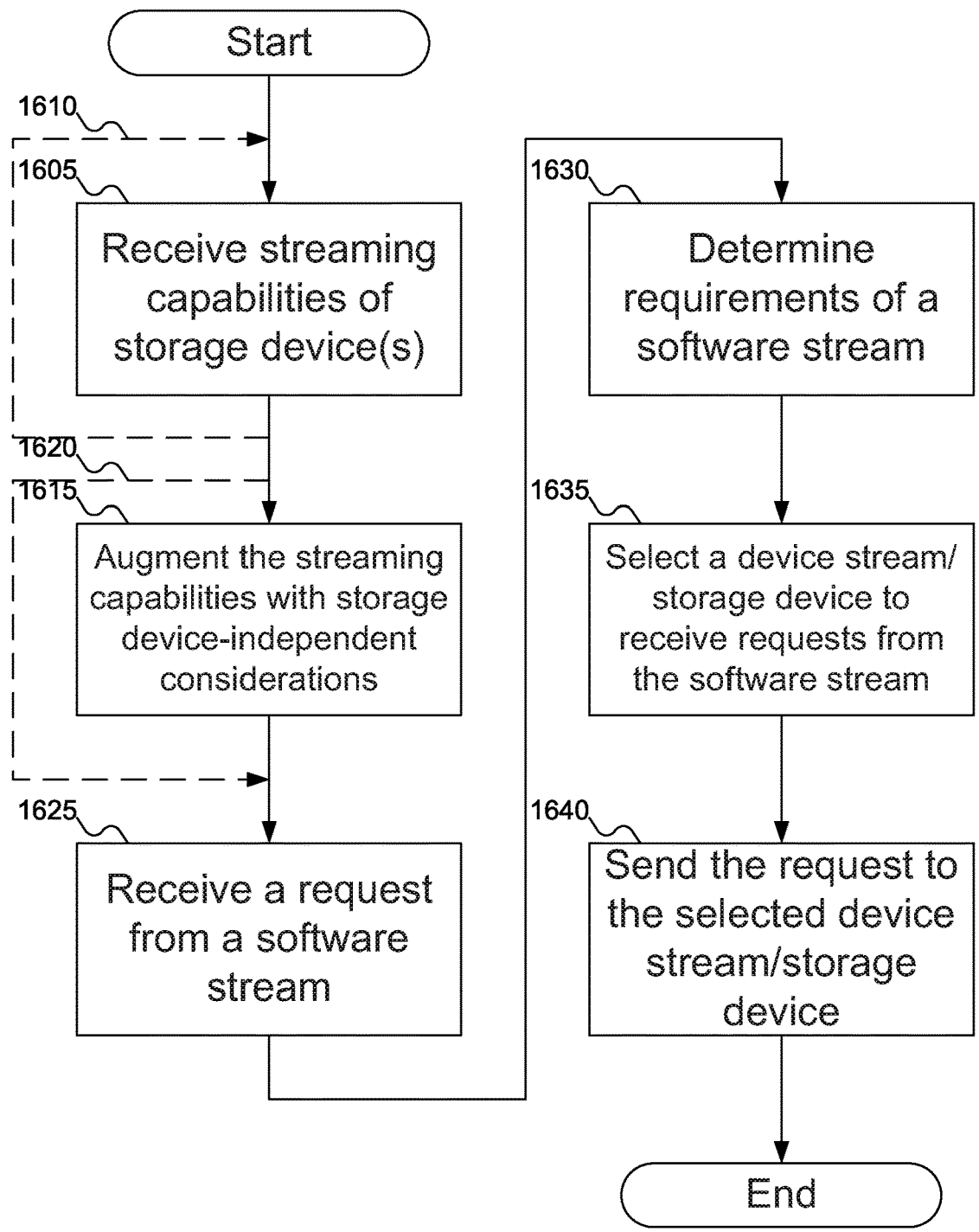
FIG. 16 shows a flowchart of an example procedure for the storage manager of FIG. 1 to assign requests to device streams in the storage device of FIG. 1, according to an embodiment of the inventive concept.

FIG. 16 shows a flowchart of an example procedure for the storage manager 135 of FIG. 1 to assign requests to device streams 425 of FIG. 4 in the storage device 120 of FIG. 1, according to an embodiment of the inventive concept. In FIG. 16, at block 1605, receiver 905 of FIG. 9 may receive streaming capabilities 605 of FIG. 6 from storage device 120 of FIG. 6. If receiver 905 of FIG. 9 receives streaming capabilities 605 of FIG. 6 from more than one storage device 120 of FIG. 1, then block 1605 may be repeated, as shown by dashed line 1610. At block 1615, augmenter 920 of FIG. 9 may augment streaming capabilities 605 of FIG. 6 with storage device-independent considerations. Block 1615 may be omitted, as shown by dashed line 1620. At block 1625, receiver 905 of FIG. 9 may receive request 815 of FIG. 8 from software stream 810 of FIG. 8. At block 1630, storage manager 135 of FIG. 1 may determine software stream requirements 1125 of FIG. 11. At block 1635, device stream selector 910 of FIG. 9 may select device stream 425 of FIG. 4 to receive requests from software stream 810 of FIG. 8. At block 1640, transmitter 915 of FIG. 9 may send request 815 of FIG. 8 to the selected device stream 425 of FIG. 4.

Figure 17:
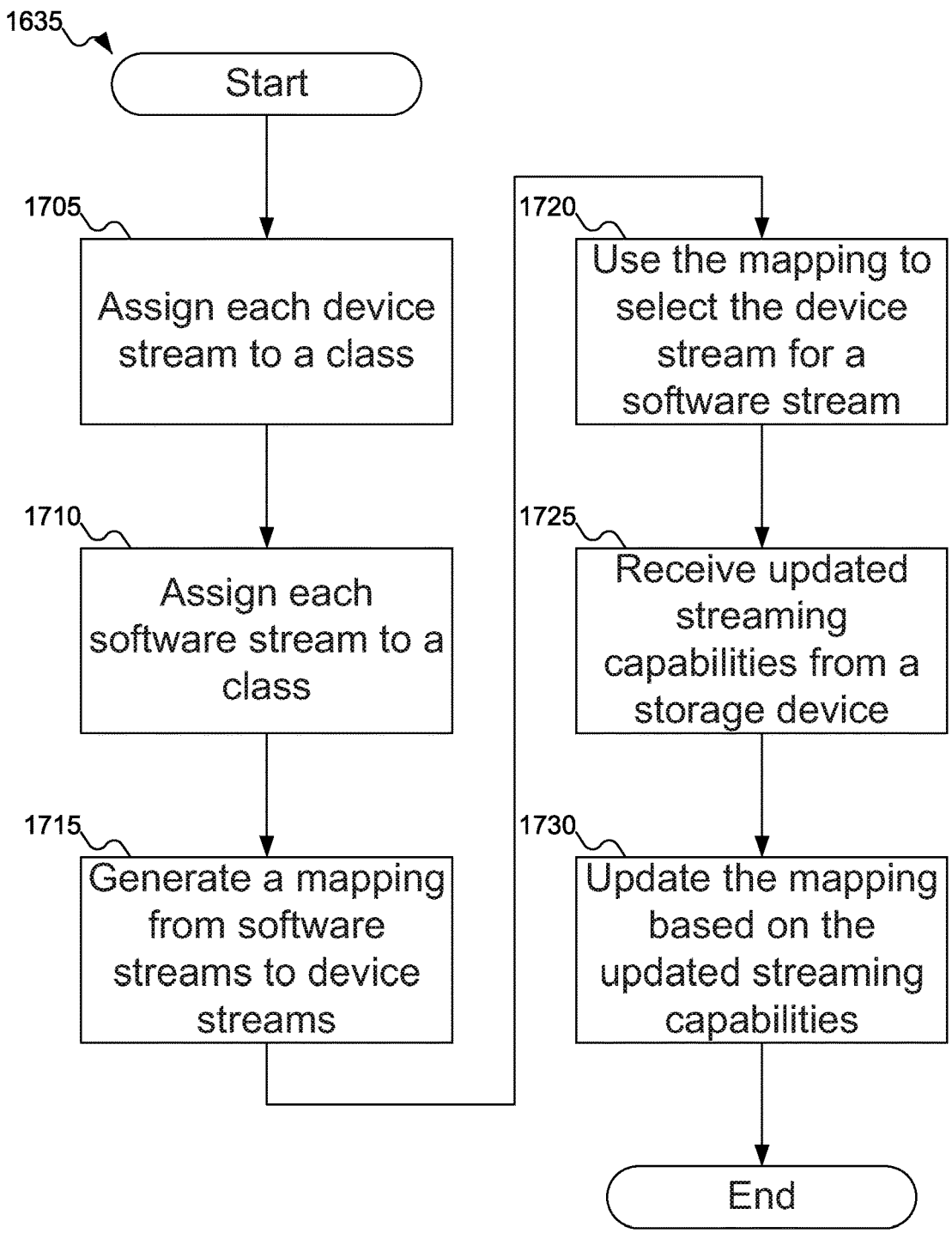
FIG. 17 shows a flowchart of an example procedure for the storage manager of FIG. 1 to map software streams to device streams, according to an embodiment of the inventive concept.

FIG. 17 shows a flowchart of an example procedure for the storage manager 135 of FIG. 1 to map software streams 810 of FIG. 8 to device streams 425 of FIG. 4, according to an embodiment of the inventive concept. In FIG. 17, at block 1705, device stream classifier 1305 of FIG. 13 may assign each device stream 425 of FIG. 4 to a class. At block 1710, software stream classifier 1310 of FIG. 13 may assign each software stream 810 of FIG. 8 to a class. At block 1715, mapper 1205 of FIG. 12 may map software streams 810 of FIG. 8 to device streams 425 of FIG. 4. At block 1720, device stream selector 910 of FIG. 9 may select device stream 425 of FIG. 4 for a particular software stream 810 of FIG. 8.

At block 1725, receiver 905 of FIG. 9 may receive updated streaming capabilities 605 of FIG. 6 from storage device 120 of FIG. 1. In that case, at block 1730, mapping updater 1210 of FIG. 1 may update the mapping from software streams 810 of FIG. 8 to device streams 425 of FIG. 4 based on updated streaming capabilities 605 of FIG. 6.

Figure 18:
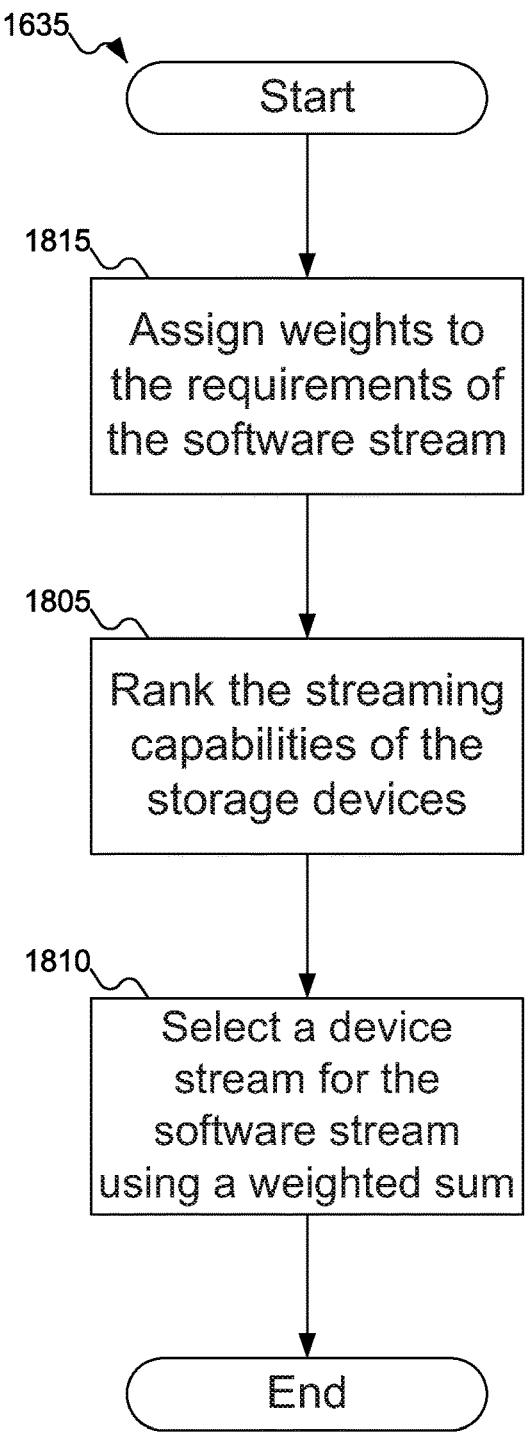
FIG. 18 shows a flowchart of an example procedure for the storage manager of FIG. 1 to select a device stream for a software stream, according to an embodiment of the inventive concept.

FIG. 18 shows a flowchart of an example procedure for the storage manager 135 of FIG. 1 to select device stream 425 of FIG. 4 for software stream 810 of FIG. 8, according to an embodiment of the inventive concept. In FIG. 18, at block 1705, weight assignor 1215 of FIG. 12 may assign weights to QoS requirements 1110 of FIG. 11. At block 1805, storage manager 135 of FIG. 1 may rank device streams 425 of FIG. 4 based on the individual streaming capabilities. At block 1810, storage manager 135 of FIG. 1 may select device stream 425 of FIG. 4 for software stream 810 of FIG. 8 using a weighted sum based on the weights and ranks of the streaming capabilities.

In FIGS. 14-18, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a storage device, comprising:

storage for data;

a number of device streams used in writing the data to the storage;

a streaming capabilities analyzer to inventory streaming capabilities of the storage device; and a transmitter to transmit the streaming capabilities of the storage device to at least one storage manager.

Statement 2. An embodiment of the inventive concept includes a storage device according to statement 1, wherein the storage device supports one of the following formats: a Non-Volatile Memory Express Over Fabric (NVMeoF) storage device, a shingled hard disk drive, a flash memory storage device, and a mixed media storage device.

Statement 3. An embodiment of the inventive concept includes a storage device according to statement 2, wherein the flash memory storage device includes a flash memory Solid State Drive (SSD).

Statement 4. An embodiment of the inventive concept includes a storage device according to statement 2, wherein the mixed media storage device includes a mixed media SSD.

Statement 5. An embodiment of the inventive concept includes a storage device according to statement 1, further comprising a controller including the streaming capabilities analyzer and the transmitter.

Statement 6. An embodiment of the inventive concept includes a storage device according to statement 1, wherein:

the storage device further comprises an update detector operative to detect when there has been an update in the streaming capabilities of the storage device;

the streaming capabilities analyzer is operative to re-inventory the updated streaming capabilities of the storage device; and the transmitter is operative to transmit the updated streaming capabilities of the storage device to the at least one storage manager.

Statement 7. An embodiment of the inventive concept includes a storage device according to statement 1, wherein:

the streaming capabilities analyzer is operative to inventory the streaming capabilities of the storage device periodically; and the transmitter is operative to transmit the streaming capabilities of the storage device to the at least one storage manager after each inventory.

Statement 8. An embodiment of the inventive concept includes a storage device according to statement 1, wherein the streaming capabilities are drawn from a set including the number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 9. An embodiment of the inventive concept includes a storage device according to statement 1, wherein the storage for data includes a first storage and a second storage, the first storage of a first type and the second storage of a second type, wherein the first type is different from the second type;

a first of the number of device streams supported by the storage device is associated with the first storage; and a second of the number of device streams supported by the storage device is associated with the second storage.

Statement 10. An embodiment of the inventive concept includes a storage device according to statement 1, further comprising a receiver to receive a request for the streaming capabilities of the storage device from the at least one storage manager.

Statement 11. An embodiment of the inventive concept includes a storage manager, comprising:

a receiver to receive at least one streaming capability of at least one storage device, requirements for at least one software stream, and a request from the at least one software stream;

a device stream selector to select one of a number of device streams supported by the at least one storage device responsive to the requirements for the at least one software stream and the at least one streaming capability of the at least one storage device; and a transmitter to transmit the request to a first storage device of the at least one storage device, the first storage device supporting the selected one of the number of device streams.

Statement 12. An embodiment of the inventive concept includes a storage manager according to statement 11, further comprising an augmenter to augment the at least one streaming capability of the at least one storage device with storage device-independent considerations.

Statement 13. An embodiment of the inventive concept includes a storage manager according to statement 11, wherein the storage manager is implemented using software running on a processor on a host machine.

Statement 14. An embodiment of the inventive concept includes a storage manager according to statement 11, wherein the storage manager is implemented as a hardware module within a host machine.

Statement 15. An embodiment of the inventive concept includes a storage manager according to statement 11, wherein the streaming capability are drawn from a set including the number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 16. An embodiment of the inventive concept includes a storage manager according to statement 11, wherein the device stream selector includes a mapper to generate a mapping from the at least one software stream to at least one of the number of device streams supported by the at least one storage device responsive to the at least one requirement of the at least one software stream and the at least one streaming capability of the at least one storage device.

Statement 17. An embodiment of the inventive concept includes a storage manager according to statement 16, wherein:

the receiver is operative to receive at least one updated streaming capability of the at least one storage device; and the device stream selector further includes a mapping updater to update the mapping responsive to the at least one updated streaming capability of the at least one storage device.

Statement 18. An embodiment of the inventive concept includes a storage manager according to statement 16, wherein the mapper includes:

a device stream classifier to assign each of the number of device streams supported by the at least one storage device to one of at least two classes; and a software stream classifier to assign each of the at least one software stream to one of the at least two classes, wherein the device stream selector is operative to select one of the number of device streams supported by the at least one storage device that is in a class with the at least one software stream.

Statement 19. An embodiment of the inventive concept includes a storage manager according to statement 16, further comprising storage for a data structure storing the mapping.

Statement 20. An embodiment of the inventive concept includes a storage manager according to statement 11, further comprising storage for a data structure storing the at least one streaming capability of the at least one storage device.

Statement 21. An embodiment of the inventive concept includes a storage manager according to statement 11, wherein the at least one streaming capability of the at least one storage device specifies that the at least one storage device includes a first storage of a first type and a second storage of a second type, wherein the first type is different from the second type.

Statement 22. An embodiment of the inventive concept includes a storage manager according to statement 11, wherein the at least one storage device includes a first storage device and a second storage device, wherein the first storage device and the second storage device support different streaming capabilities.

Statement 23. An embodiment of the inventive concept includes a storage manager according to statement 22, wherein:

a first storage device supporting a first type of storage; and a second storage device supporting a second type of storage, the second type of storage different from the first type of storage.

Statement 24. An embodiment of the inventive concept includes a storage manager according to statement 22, wherein the different streamlining capabilities include different numbers of device streams, different erase block sizes, different storage capacities, different auto-streaming capabilities, different Optimal Stream Write Sizes, different in-storage computing capabilities, different Program and Erase speed parameters, different buffer sizes, different throughput limitations, and different firmware versions.

Statement 25. An embodiment of the inventive concept includes a storage manager according to statement 11, wherein:

the requirements for the at least one software stream include at least two requirements for the at least one software stream;

the device stream selector includes a weight assignor to assign weights to the at least two requirements for the at least one software stream; and the device stream selector is operative to select the at least one of the number of device streams supported by the at least one storage device responsive to the weights and the at least one streaming capability of the at least one storage device.

Statement 26. An embodiment of the inventive concept includes a method, comprising:

determining streaming capabilities of a storage device by the storage device;

identifying at least one storage manager that communicates with the storage device; and reporting the streaming capabilities from the storage device to the at least one storage manager.

Statement 27. An embodiment of the inventive concept includes a method according to statement 26, further comprising:

determining a second streaming capabilities of the storage device at a later time; and reporting the second streaming capabilities to the at least one storage manager.

Statement 28. An embodiment of the inventive concept includes a method according to statement 26, wherein:

determining streaming capabilities of a storage device by the storage device includes periodically determining the streaming capabilities of the storage device by the storage device; and reporting the streaming capabilities from the storage device to the at least one storage manager includes periodically reporting the streaming capabilities from the storage device to the at least one storage manager.

Statement 29. An embodiment of the inventive concept includes a method according to statement 26, further comprising:

identifying that the streaming capabilities of the storage device have changed;

determining second streaming capabilities of the storage device after identifying that the streaming capabilities of the storage device have changed; and reporting the second streaming capabilities to the at least one storage manager.

Statement 30. An embodiment of the inventive concept includes a method according to statement 29, wherein identifying that the streaming capabilities of the storage device have changed includes allocating one of a number of device streams supported by the storage device to one of the at least one storage manager.

Statement 31. An embodiment of the inventive concept includes a method according to statement 29, wherein identifying that the streaming capabilities of the storage device have changed includes changing an auto-streaming capability of the storage device.

Statement 32. An embodiment of the inventive concept includes a method according to statement 26, wherein the streaming capabilities are drawn from a set including a number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 33. An embodiment of the inventive concept includes a method according to statement 32, wherein:

the physical heterogeneity of the storage device includes a first storage and a second storage, the first storage of a first type and the second storage of a second type, wherein the first type is different from the second type;

a first of the number of device streams supported by the storage device is associated with the first storage; and a second of the number of device streams supported by the storage device is associated with the second storage.

Statement 34. An embodiment of the inventive concept includes a method according to statement 26, wherein the storage device is drawn from a set including a Non-Volatile Memory Express Over Fabric (NVMeoF) storage device, a shingled hard disk drive, a flash memory storage device, and a mixed media storage device.

Statement 35. An embodiment of the inventive concept includes a method according to statement 34, wherein the flash memory storage device includes a flash memory Solid State Drive (SSD).

Statement 36. An embodiment of the inventive concept includes a method according to statement 34, wherein the mixed media storage device includes a mixed media SSD.

Statement 37. An embodiment of the inventive concept includes a method according to statement 26, wherein:

the method further comprises receiving a request from the at least one storage manager for the streaming capabilities of the storage device;

determining streaming capabilities of a storage device by the storage device includes determining the streaming capabilities of the storage device responsive to the request from the at least one storage manager for the streaming capabilities of the storage device; and reporting the streaming capabilities to the at least one storage manager includes reporting the streaming capabilities to the at least one storage manager responsive to the request from the at least one storage manager for the streaming capabilities of the storage device.

Statement 38. An embodiment of the inventive concept includes a method, comprising:

receiving at least two streaming capabilities of at least one storage device, the at least one storage device supporting a number of device streams;

receiving a request from at least one software stream;

determining at least one requirement of the at least one software stream;

selecting at least one of the number of device streams supported by the at least one storage device responsive to the at least one requirement of the at least one software stream and the at least one streaming capability of the at least one storage device; and sending the request from the at least one software stream to the at least one storage device using the selected at least one of the number of device streams.

Statement 39. An embodiment of the inventive concept includes a method according to statement 38, wherein the at least two streamlining capabilities differ in at least one of numbers of device streams, erase block sizes, storage capacities, auto-streaming capabilities, Optimal Stream Write Sizes, in-storage computing capabilities, Program and Erase speed parameters, buffer sizes, throughput limitations, and firmware versions.

Statement 40. An embodiment of the inventive concept includes a method according to statement 38, wherein the streaming capabilities are drawn from a set including a number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 41. An embodiment of the inventive concept includes a method according to statement 38, further comprising augmenting the at least one streaming capability of the at least one storage device with storage device-independent considerations.

Statement 42. An embodiment of the inventive concept includes a method according to statement 38, wherein selecting at least one of the number of device streams supported by the at least one storage device responsive to the at least one requirement of the at least one software stream and the at least one streaming capability of the at least one storage device includes:

generating a mapping from the at least one software stream to at least one of the number of device streams supported by the at least one storage device responsive to the at least one requirement of the at least one software stream and the at least one streaming capability of the at least one storage device; and using the mapping to select the at least one of the number of device streams supported by the at least one storage device responsive to the at least one software stream.

Statement 43. An embodiment of the inventive concept includes a method according to statement 42, further comprising:

receiving at least one updated streaming capability of the at least one storage device; and updating the mapping from the at least one software stream to the at least one of the number of device streams supported by the at least one storage device responsive to the at least one updated streaming capability of the at least one storage device.

Statement 44. An embodiment of the inventive concept includes a method according to statement 42, wherein generating a mapping from the at least one software stream to at least one of the number of device streams supported by the at least one storage device responsive to the at least one requirement of the at least one software stream and the at least one streaming capability of the at least one storage device includes:

assigning each of the number of device streams supported by the at least one storage device using the at least one streaming capability of the at least one storage device to one of at least two classes;

assigning the at least one software stream to one of the at least two classes; and generating the mapping by assigning the at least one software stream to at least one of the at least one of the number of device streams supported by the at least one storage device that has a same class.

Statement 45. An embodiment of the inventive concept includes a method according to statement 38, wherein receiving at least two streaming capabilities of at least one storage device, the at least one storage device supporting a number of device streams includes:

receiving at least a first streaming capability of at least a first storage device, the first storage device supporting at least a first type of storage; and receiving at least a second streaming capability of at least a second storage device, the second storage device supporting at least a second type of storage, the second type of storage different from the first type of storage.

Statement 46. An embodiment of the inventive concept includes a method according to statement 38, wherein the at least one storage device includes a first storage and a second storage, the first storage of a first type and the second storage of a second type, wherein the first type is different from the second type.

Statement 47. An embodiment of the inventive concept includes a method according to statement 38, wherein:

determining at least one requirement of the at least one software stream includes determining at least two requirements of the at least one software stream, wherein the at least two requirements represent a subset of the at least one streaming capability of the at least one storage device; and selecting at least one of the number of device streams supported by the at least one storage device responsive to the at least one requirement of the at least one software stream and the at least one streaming capability of the at least one storage device includes:

assigning weights to the at least two requirements of the at least one software stream; and selecting the at least one of the number of device streams supported by the at least one storage device responsive to the weights and the at least one streaming capability of the at least one storage device.

Statement 48. An embodiment of the inventive concept includes an article, comprising a non-transitory storage medium, the non-transitory storage medium having stored thereon instructions that, when executed by a machine, result in:

determining streaming capabilities of a storage device by the storage device;

identifying at least one storage manager that communicates with the storage device; and reporting the streaming capabilities from the storage device to the at least one storage manager.

Statement 49. An embodiment of the inventive concept includes an article according to statement 48, the non-transitory storage medium having stored thereon further instructions that, when executed by the machine, result in:

determining a second streaming capabilities of the storage device at a later time; and reporting the second streaming capabilities to the at least one storage manager.

Statement 50. An embodiment of the inventive concept includes an article according to statement 48, the non-transitory storage medium having stored thereon further instructions that, when executed by the machine, result in:

identifying that the streaming capabilities of the storage device have changed;

determining second streaming capabilities of the storage device after identifying that the streaming capabilities of the storage device have changed; and reporting the second streaming capabilities to the at least one storage manager.

Statement 51. An embodiment of the inventive concept includes an article according to statement 50, wherein identifying that the streaming capabilities of the storage device have changed includes allocating one of a number of device streams supported by the storage device to one of the at least one storage manager.

Statement 52. An embodiment of the inventive concept includes an article according to statement 50, wherein identifying that the streaming capabilities of the storage device have changed includes changing an auto-streaming capability of the storage device.

Statement 53. An embodiment of the inventive concept includes an article according to statement 48, wherein the streaming capabilities are drawn from a set including a number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 54. An embodiment of the inventive concept includes an article according to statement 53, wherein:

the physical heterogeneity of the storage device includes a first storage and a second storage, the first storage of a first type and the second storage of a second type, wherein the first type is different from the second type;

a first of the number of device streams supported by the storage device is associated with the first storage; and a second of the number of device streams supported by the storage device is associated with the second storage.

Statement 55. An embodiment of the inventive concept includes an article according to statement 48, wherein the storage device is drawn from a set including a Non-Volatile Memory Express Over Fabric (NVMeoF) storage device, a shingled hard disk drive, a flash memory storage device, and a mixed media storage device.

Statement 56. An embodiment of the inventive concept includes an article according to statement 55, wherein the flash memory storage device includes a flash memory Solid State Drive (SSD).

Statement 57. An embodiment of the inventive concept includes an article according to statement 55, wherein the mixed media storage device includes a mixed media SSD.

Statement 58. An embodiment of the inventive concept includes an article according to statement 48, wherein:

the method further comprises receiving a request from the at least one storage manager for the streaming capabilities of the storage device;

determining streaming capabilities of a storage device by the storage device includes determining the streaming capabilities of the storage device responsive to the request from the at least one storage manager for the streaming capabilities of the storage device; and reporting the streaming capabilities to the at least one storage manager includes reporting the streaming capabilities to the at least one storage manager responsive to the request from the at least one storage manager for the streaming capabilities of the storage device.

Statement 59. An embodiment of the inventive concept includes an article, comprising a non-transitory storage medium, the non-transitory storage medium having stored thereon instructions that, when executed by a machine, result in:

receiving at least two streaming capabilities of at least one storage device, the at least one storage device supporting a number of device streams;

receiving a request from at least one software stream;

determining at least one requirement of the at least one software stream;

selecting at least one of the number of device streams supported by the at least one storage device responsive to the at least one requirement of the at least one software stream and the at least one streaming capability of the at least one storage device; and sending the request from the at least one software stream to the at least one storage device using the selected at least one of the number of device streams.

Statement 60. An embodiment of the inventive concept includes an article according to statement 59, wherein the at least two streamlining capabilities differ in at least one of numbers of device streams, erase block sizes, storage capacities, auto-streaming capabilities, Optimal Stream Write Sizes, in-storage computing capabilities, Program and Erase speed parameters, buffer sizes, throughput limitations, and firmware versions.

Statement 61. An embodiment of the inventive concept includes an article according to statement 59, wherein the streaming capabilities are drawn from a set including a number of device streams supported by the storage device, a size of an erase block on the storage device, a description of a physical heterogeneity of the storage device, an auto-streaming capability of the storage device, an Optimal Stream Write Size of the storage device, in-storage computing (ISC) supported by the storage device, Program and Erase speed parameters of the storage device, a buffer size of the storage device, throughput limitations on the device streams supported by the storage device, and firmware version of the storage device.

Statement 62. An embodiment of the inventive concept includes an article according to statement 59, the non-transitory storage medium having stored thereon further instructions that, when executed by the machine, result in augmenting the at least one streaming capability of the at least one storage device with storage device-independent considerations.

Statement 63. An embodiment of the inventive concept includes an article according to statement 59, wherein selecting at least one of the number of device streams supported by the at least one storage device responsive to the at least one requirement of the at least one software stream and the at least one streaming capability of the at least one storage device includes:

generating a mapping from the at least one software stream to at least one of the number of device streams supported by the at least one storage device responsive to the at least one requirement of the at least one software stream and the at least one streaming capability of the at least one storage device; and using the mapping to select the at least one of the number of device streams supported by the at least one storage device responsive to the at least one software stream.

Statement 64. An embodiment of the inventive concept includes an article according to statement 63, the non-transitory storage medium having stored thereon further instructions that, when executed by the machine, result in:

receiving at least one updated streaming capability of the at least one storage device; and updating the mapping from the at least one software stream to the at least one of the number of device streams supported by the at least one storage device responsive to the at least one updated streaming capability of the at least one storage device.

Statement 65. An embodiment of the inventive concept includes an article according to statement 63, wherein generating a mapping from the at least one software stream to at least one of the number of device streams supported by the at least one storage device responsive to the at least one requirement of the at least one software stream and the at least one streaming capability of the at least one storage device includes:

assigning each of the number of device streams supported by the at least one storage device using the at least one streaming capability of the at least one storage device to one of at least two classes;

assigning the at least one software stream to one of the at least two classes; and generating the mapping by assigning the at least one software stream to at least one of the at least one of the number of device streams supported by the at least one storage device that has a same class.

Statement 66. An embodiment of the inventive concept includes an article according to statement 59, wherein receiving at least two streaming capabilities of at least one storage device, the at least one storage device supporting a number of device streams includes:

receiving at least a first streaming capability of at least a first storage device, the first storage device supporting at least a first type of storage; and receiving at least a second streaming capability of at least a second storage device, the second storage device supporting at least a second type of storage, the second type of storage different from the first type of storage.

Statement 67. An embodiment of the inventive concept includes an article according to statement 59, wherein the at least one storage device includes a first storage and a second storage, the first storage of a first type and the second storage of a second type, wherein the first type is different from the second type.

Statement 68. An embodiment of the inventive concept includes an article according to statement 59, wherein:

determining at least one requirement of the at least one software stream includes determining at least two requirements of the at least one software stream, wherein the at least two requirements represent a subset of the at least one streaming capability of the at least one storage device; and selecting at least one of the number of device streams supported by the at least one storage device responsive to the at least one requirement of the at least one software stream and the at least one streaming capability of the at least one storage device includes:

assigning weights to the at least two requirements of the at least one software stream; and selecting the at least one of the number of device streams supported by the at least one storage device responsive to the weights and the at least one streaming capability of the at least one storage device.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A storage manager, comprising:
    a receiver to receive a first capability of a first device stream of a first storage device and a second capability of a second device stream of a second storage device, a requirement for a stream identified using a stream identifier assigned by an application, and a request associated with the stream, the first capability different from the second capability, the requirement including at least one of a bandwidth level, a priority level, or a latency level;
    a device to select the first device stream based at least in part on the requirement for the stream, the first capability, and the second capability, wherein at least a portion of the device is implemented with a processor; and
    a transmitter to transmit the request associated with the first device stream.

2. A storage manager according to claim 1, wherein the first capability and the second capability include a size of an erase block, an auto-streaming capability, an Optimal Stream Write Size, in-storage computing (ISC) capability, Program and Erase speed parameters, a buffer size, throughput limitations on the first device stream and the second device stream, or a storage capacity.

3. A storage device according to claim 1, wherein the first storage device includes a Non-Volatile Memory Express Over Fabric (NVMeoF) storage device, a shingled hard disk drive, a flash memory storage device, or a mixed media storage device.

4. A storage manager according to claim 1, further comprising storage for a data structure storing the first capability and the second capability.

5. A storage manager according to claim 1, wherein the device includes a mapper to generate a mapping from the stream to the first device stream based at least in part on the requirement of the stream and the first capability, wherein at least a portion of the mapper is implemented with the processor.

6. A storage manager according to claim 5, wherein:
    the receiver is configured to receive an updated capability; and
    the device further includes a circuit to update the mapping from the stream to the second device stream responsive to the updated capability of the first storage device.

7. A storage manager according to claim 5, further comprising storage for a data structure storing the mapping.

8. A storage manager according to claim 5, wherein the mapper includes:
    a device stream classifier to assign the first device stream to a first class and to assign the second device stream to a second class; and
    a stream classifier to assign the stream to the first class, wherein the device is operative to select the first device stream based at least in part on the device stream and the stream being assigned to the first class.

9. A storage manager according to claim 1, wherein the first capability of specifies that the first storage device includes a first storage of a first type and the second capability specifies that the second storage device includes a second storage of a second type, the first type different from the second type.

10. A storage manager according to claim 1, wherein:
the first storage device supports a first type of storage; and
the second storage device supports a second type of storage, the second type of storage different from the first type of storage.

11. A storage manager according to claim 1, wherein:
the requirement for the stream includes a second requirement of the stream;
the device includes a weight assignor to assign a first weight to the requirement and a second weight to the second requirement, wherein at least a portion of the weight assignor is implemented with the processor; and
the device is configured to select the first device stream based at least in part on the requirement and the second requirement of the stream, the first weight, the second weight, the first capability, and the second capability.

12. A storage manager according to claim 1, wherein the storage manager is configured to ensure that the sum of all requirements does not exceed the capability of the first storage device.

13. A storage manager according to claim 1, wherein:
data associated with the first device stream may be written across a first channel and a second channel offered by the first storage device, and
the first storage device includes a controller to control reading data from the first storage device or writing data to the first storage device.

14. A storage manager according to claim 1, wherein first capability is different from the second capability.

15. A method, comprising:
receiving, at a storage manager, a first capability of a first device stream of a first storage device and a second capability of a second device stream of a second storage device;
receiving a request associated with a stream identified using a stream identifier assigned by an application;
determining a requirement of the stream, the requirement including at least one of a bandwidth level, a priority level, or a latency level;
selecting, at the storage manager, the first device stream based at least in part on the requirement of the stream, the first capability, and the second capability; and
sending the request associated with the stream to the first storage device, the request associated with the first device stream.

16. A method according to claim 15, wherein selecting, at the storage manager, the first device stream based at least in part on the requirement of the stream, the first capability, and the second capability includes:
generating a mapping from the stream to the first device stream based at least in part on the requirement of the stream, the first capability, and the second capability; and
using the mapping to select the first device stream based at least in part on the stream.

17. A method according to claim 16, further comprising:
receiving an updated capability; and
updating the mapping from the stream to the second device stream based at least in part on the updated capability.

18. A method according to claim 16, wherein generating a mapping from the stream to the first device stream based at least in part on the requirement of the stream, the first capability, and the second capability includes:
assigning the first device stream to a first class;
assigning the second device stream to a second class;
assigning the stream to the first class; and
generating the mapping by assigning the stream to the first device stream based at least in part on the first device stream and the stream being assigned to the first class.

19. A method according to claim 15, wherein:
determining a requirement of the stream includes determining a second requirement of the stream; and
selecting, at the storage manager, the first device stream based at least in part on the requirement of the stream, the first capability, and the second capability includes:
assigning a first weight to the requirement;
assigning a second weight to the second requirement; and
selecting, at the storage manager, the first device stream based at least in part on the requirement and the second requirement of the stream, the first weight, the second weight, the first capability, and the second capability.

20. A method according to claim 15, wherein the storage manager is configured to ensure that the sum of all requirements does not exceed the capability of the first storage device.

* * * * *